United States Patent

Fukushima et al.

[11] Patent Number: 5,726,410
[45] Date of Patent: Mar. 10, 1998

[54] SEAM WELDING PROCESS AND SEAM WELDING APPARATUS

[75] Inventors: Toshihiro Fukushima, Chiryu; Masaki Tanzawa; Nobuhide Kondou, both of Toyota; Fumiaki Natsumi, Okazaki; Munetaka Toda, Kariya, all of Japan

[73] Assignee: Toyota Jidosha Kabushiki Kaisha, Japan

[21] Appl. No.: 732,353

[22] PCT Filed: Feb. 13, 1996

[86] PCT No.: PCT/JP96/00302

§ 371 Date: Jan. 27, 1997

§ 102(e) Date: Jan. 27, 1997

[87] PCT Pub. No.: WO96/26036

PCT Pub. Date: Aug. 29, 1996

[30] Foreign Application Priority Data

Feb. 22, 1995 [JP] Japan ................. 7-059758

[51] Int. Cl.$^6$ ................. B23K 11/00
[52] U.S. Cl. ................. 219/117.1; 219/86.41
[58] Field of Search ................. 219/117.1, 118, 219/64, 86.41, 83

[56] References Cited

U.S. PATENT DOCUMENTS

| | | | |
|---|---|---|---|
| 3,716,906 | 2/1973 | Troughton | 29/460 |
| 3,733,670 | 5/1973 | Troughton | 29/200 A |
| 4,145,986 | 3/1979 | Bauer | 113/7 R |
| 4,732,026 | 3/1988 | Ban | 72/52 |
| 4,879,445 | 11/1989 | Kawano et al. | 219/64 |
| 5,249,725 | 10/1993 | Nakatsu | 228/5.5 |

FOREIGN PATENT DOCUMENTS

| | | |
|---|---|---|
| 52-106340 | 9/1977 | Japan. |
| 59-13581 | 1/1984 | Japan. |
| 59-223179 | 12/1984 | Japan. |
| 61-52994 | 3/1986 | Japan. |
| 1-157781 | 6/1989 | Japan. |
| 5-200558 | 8/1993 | Japan. |
| 6-71452 | 3/1994 | Japan. |

*Primary Examiner*—Adolf Berhane
*Attorney, Agent, or Firm*—Finnegan, Henderson, Farabow, Garrett & Dunner, L.L.P.

[57] ABSTRACT

Seam welding process and apparatus, wherein two plate-like workpieces are fed in a feeding direction toward a pair of roller electrodes, by guide rollers rotated by a driving device, while the workpieces are guided by a guiding device such that the edge portions overlap each other with a predetermined lap amount so that the overlapping edge portions are squeezed by the roller electrodes, and the edge portions are continuously welded together with a welding current being applied between the roller electrodes.

18 Claims, 17 Drawing Sheets

SEAM WELDING PROCESS AND SEAM WELDING APPARATUS

FIELD OF THE ART

This invention relates to a seam welding process and a seam welding apparatus for continuously welding together two plate-like workpieces by overlapping the workpieces at their edges and applying a welding current between a pair of roller electrodes while the overlapping edge portions of the two plate-like workpieces are squeezed, or squeezed to be mashed, by and between the pair of roller electrodes.

BACKGROUND TECHNOLOGY

High-speed welding is possible by seam welding in which two plate-like workpieces are continuously welded together at their overlapping edge portions while the edge portions are squeezed or squeezed to be mashed by and between a pair of roller electrodes, with a welding current being applied between the pair of roller electrodes. Since the seam welding is suitable for mass production, it is widely employed in production lines for steel plates, automobiles, etc.

In such seam welding, a force of the pair of roller electrodes applied to the overlapping edge portions of the two plate-like workpieces generates an expanding force at the edge portions. To prevent the overlapping edge portions of the two plate-like workpieces from moving away from each other, it is required to firmly hold the plate-like workpieces together. This requirement is particularly high, in a mash seam welding operation in which the two plate-like workpieces are continuously welded while the overlapping edge portions are squeezed so as to be mashed by the pair of roller electrodes, with a large force of expansion generated at the mashed edge portions in the direction away from each other.

Conventionally, therefore, two plate-like workpieces $12_H$, $12_M$ are firmed held by upper and lower clamping members 120 of a clamping mechanism 122, as shown in FIG. 10. The two plate-like workpieces $12_H$, $12_M$ are continuously welded together at their overlapping edge portions while the upper and lower clamping members 120 are moved relative to a pair of roller electrodes $20_U$, $20_S$. Examples of such a conventional seam welding apparatus are disclosed in JP-A-59-223179 and JP-A-61-52994.

In the conventional seam welding apparatus described above, however, the upper and lower clamping members 120 or the pair of roller electrodes $20_U$, $20_S$ must be separated from the welded plate-like workpieces $12_H$, $12_M$ and moved to the original position after the seam welding process is completed by relative movement of the clamping mechanism 122 and the roller electrodes $20_U$, $20_S$. Therefore, the seam welding apparatus is undesirably complicated or large-sized due to a feeding mechanism for effecting the relative movement of the clamping mechanism and electrodes. Where the roller electrodes $20_U$, $20_S$ are adapted to be returned to the original position, there is a drawback that the production efficiency of the seam welding apparatus is lowered due to interruption of adjustment of the electrodes.

The present invention was made in the light of the above background. It is an object of the invention to provide a seam welding process and a seam welding apparatus, which permit continuous welding without relative movement of a clamping mechanism and roller electrodes, and which assure high production efficiency with small-sized equipment.

DISCLOSE OF THE INVENTION

The above object may be achieved according to the principle of the present invention, which provides a seam welding process of continuously welding two plate-like workpieces at overlapping edge portions thereof while the overlapping edge portions are squeezed by a pair of roller electrodes disposed rotatably about respective two parallel axes thereof, comprising: (a) a moving step of feeding the two plate-like workpieces in one direction toward the roller electrodes, by using a plurality of pairs of guide rollers to pinch the two plate-like workpieces in a direction of thickness thereof; (b) a guiding step of guiding the two plate-like workpieces being fed in the one direction in the moving step, such that the edge portions overlap each other with a predetermined lap amount so that the overlapping edge portions are squeezed by the pair of roller electrodes; and (c) a welding step of continuously welding the edge portions of the two plate-like workpieces squeezed by the pair of roller electrodes, by applying a welding current between the pair of roller electrodes.

In the present process, the two plate-like workpieces pinched by the plurality of pairs of guide rollers are fed by rotation of the guide rollers in the direction perpendicular to the axes of the above-indicated roller electrodes. In this feeding step, the guiding step is performed to guide the two plate-like workpieces so that the edge portions overlapping each other with the predetermined lap amount are squeezed by the above-indicated pair of roller electrodes. In the welding step, the edge portions of the two plate-like workpieces squeezed by the above-indicated pair of roller electrodes are continuously welded with the welding current being applied between the pair of roller electrodes. According to the process of the present invention, therefore, a seal welding apparatus is less complicated and smaller in size than an apparatus which uses a clamping mechanism for moving the plate-like workpieces to the pair of roller electrodes while the workpieces are held by upper and lower clamping members. The present apparatus does not require a mechanism as provided in the apparatus with the above clamping mechanism, for returning the upper and lower clamping members after its removal from the welded plate-like workpieces. Further, the present process is free from deterioration of seam welding efficiency due to movements of the roller electrodes, and permits higher seam welding efficiency than in an apparatus adapted to reciprocate the roller electrodes relative to the upper and lower clamping members.

Preferably, the guiding step comprises providing a guide member which is fixedly disposed upstream of the pair of roller electrodes and which has a pair of guide surfaces parallel to a direction perpendicular to the axes of the roller electrodes, and guiding the two plate-like workpieces such that end faces of the overlapping edge portions of the two plate-like workpieces are in sliding contact with the pair of guide surfaces. In this case, it is possible to improve the positioning accuracy of the overlapping edge portions of the two plate-like workpieces, with a simple arrangement.

It is also preferable that the guiding step comprises providing at least two pairs of guide rollers which are located on opposite sides of the guide member to pinch the two plate-like workpieces in the direction of thickness and which generate forces including components acting in a directions toward the guide surfaces of the guide member while the two plate-like workpieces are fed, whereby the end faces of the overlapping edge portions of the two plate-like workpieces are brought into sliding contact with the guide surfaces. In this case, the above-indicated two plate-like workpieces are forced onto the guide surfaces of the guide member while the plate-like workpieces are fed in the feeding direction by the at least two pairs of guide rollers.

This arrangement is advantageous for a reduced number of sliding portions than in an arrangement wherein guide plates are provided for forcing the plate-like workpieces onto the guide surfaces of the guide member.

It is also preferable that the welding process comprises welding the two plate-like workpieces while the edge portions are squeezed to be mashed by a pair of roller electrodes which are disposed rotatably about respective two parallel axes and which are biased toward each other. This arrangement does not require a chamfering operation or other preliminary treatment of the edge portions of the plate-like workpieces. In this so-called "mash seam welding", a large clamping mechanism is conventionally required for resisting a large expanding force generated by mashing of the two plate-like workpieces by the pair of roller electrodes. In this respect, the present process is advantageous over the conventional process.

It is also preferable that the present seam welding process further comprises a step of squeezing, in the welding step, the two plate-like workpieces in the direction of thickness with a predetermined squeezing force by two pairs of retainer rollers disposed on opposite sides of the pair of roller electrodes, respectively, such that the two pairs of retainer rollers generate friction forces resisting expanding forces of the two plate-like workpieces in the welding step, to thereby prevent movements of the two plate-like workpieces away from each other. In this case, the movements of the edge portions of the plate-like workpieces away from each other in the welding step are prevented, whereby the accuracy of the welding position is effectively improved.

It is also preferable that the present seam welding process further comprises a pressing step of pressing portions of the plate-like workpieces which are located between the roller electrodes and the retainer rollers in an axial direction of the roller electrodes and at which convex deformation is expected to take place. This arrangement prevents the movements of the edge portions of the plate-like workpieces away from each other due to the convex deformation of the plate-like workpieces, and is therefore effective to prevent the resulting difficulty in forming the weld nugget within the two plate-like workpieces, and the consequent reduction in the weld strength.

It is also preferable that the present seam welding process further comprises an electrode driving step of rotating the roller electrodes so as to transfer a driving force to the plate-like workpieces in the feeding direction. In this case, the driving force for feeding the plate-like workpieces is transferred from the roller electrodes to the plate-like workpieces, so as to restrict the expanding force of the pair of plate-like workpieces, which would cause movements of the edge portions of the plate-like workpieces away from each other. Thus, the present arrangement is effective to prevent the difficulty in forming the weld nugget within the two plate-like workpieces.

It is also preferable that the present seam welding process further comprises a coolant supply step of supply a coolant fluid to portions of the plate-like workpieces which are squeezed by the roller electrodes, for cooling portions of the plate-like workpieces which are heated by seam welding by the roller electrodes. In this instance, the supply of the coolant fluid is effective to reduce the expanding force of the pair of plate-like workpieces which is generated due to heat at the weld nugget formed within the plate-like workpieces between the roller electrodes upon application of the electric current between the roller electrodes. Thus, the present arrangement is effective to prevent the difficulty in forming the weld nugget within the two plate-like workpieces between the roller electrodes.

The above process of the present invention may be suitably practiced by a seam welding apparatus adapted to continuously weld two plate-like workpieces at overlapping edge portions thereof while the overlapping edge portions are squeezed by a pair of roller electrodes disposed rotatably about respective two parallel axes thereof and while a welding current is applied between the pair of roller electrodes, the apparatus comprising: (a) a pair of roller electrodes disposed rotatably about respective two parallel axes thereof and biased toward each other; (b) a plurality of pairs of guide rollers which are disposed on opposite sides of the two plate-like workpieces in a direction of thickness of the workpieces, rotatably about axes thereof substantially parallel to the axes of the roller electrodes; (c) a driving device for rotating at least a portion of the plurality of pairs of guide rollers in a predetermined rotating direction, to feed the two plate-like workpieces in one direction while the two plate-like workpieces are pinched by the guide rollers; and (d) a guiding device for guiding the two plate-like workpieces being fed in the one direction by the driving device, such that the edge portions overlap each other with a predetermined lap amount so that the overlapping edge portions are squeezed by the pair of roller electrodes.

In the present apparatus, the two plate-like workpieces pinched by the plurality of pairs of guide rollers are fed by rotation of the guide rollers by the driving device in the direction perpendicular to the axes of the above-indicated roller electrodes. During the feeding of the two plate-like workpieces, these workpieces are guided by the guiding device so that the edge portions overlapping each other with the predetermined lap amount are squeezed by the above-indicated pair of roller electrodes. According to this arrangement, the edge portions of the two plate-like workpieces squeezed by the above-indicated pair of roller electrodes are continuously welded with the welding current being applied between the pair of roller electrodes. Therefore, the present seam welding apparatus is less complicated and smaller in size than an apparatus which uses a clamping mechanism for moving the plate-like workpieces to the pair of roller electrodes while the workpieces are held by upper and lower clamping members. The present apparatus does not require a mechanism as provided in the apparatus with the above clamping mechanism, for returning the upper and lower clamping members after its removal from the welded plate-like workpieces. Further, the present apparatus is free from deterioration of seam welding efficiency due to movements of the roller electrodes, and permits higher seam welding efficiency than in an apparatus adapted to reciprocate the roller electrodes relative to the upper and lower clamping members.

Preferably, the guide device includes a guide member which is fixedly disposed upstream of the pair of roller electrodes and which has a pair of guide surfaces parallel to a direction perpendicular to the axes of the roller electrodes, the guide device positioning the two plate-like workpieces relative to each other during feeding of the plate-like workpieces such that end faces of the overlapping edge portions of the two plate-like workpieces are in sliding contact with the pair of guide surfaces. In this case, it is possible to improve the positioning accuracy of the overlapping edge portions of the two plate-like workpieces, with a simple arrangement.

It is also preferable that the guide device has at least two pairs of guide rollers located on opposite sides of the guide member in a direction of thickness thereof to pinch the two plate-like workpieces, the at least two pairs of guide rollers guiding the two plate-like workpieces such that the two plate-like workpieces approach the guiding surfaces of the guide member as the two plate-like workpieces approach the roller electrodes, whereby the end faces of the overlapping edge portions of the two plate-like workpieces are brought into sliding contact with the guide surfaces. In this case, the above-indicated two plate-like workpieces are forced onto the guide surfaces of the guide member while the plate-like workpieces are fed in the feeding direction by the at least two pairs of guide rollers. This arrangement is advantageous for a reduced number of sliding portions than in an arrangement wherein guide plates are provided for forcing the plate-like workpieces onto the guide surfaces of the guide member.

It is also preferable that the pair of roller electrodes are adapted to weld the edge portions of the plate-like workpieces while the edge portions of the two plate-like workpieces are squeezed to be mashed by the pair of roller electrodes. This arrangement does not require a chamfering operation or other preliminary treatment of the edge portions of the plate-like workpieces. In this so-called "mash seam welding", a large clamping mechanism is conventionally required for resisting a large expanding force generated by mashing of the two plate-like workpieces by the pair of roller electrodes. In this respect, the present process is advantageous over the conventional process.

It is also preferable that the seam welding apparatus further comprises: two pairs of retainer rollers which are disposed on opposite sides of the pair of roller electrodes, rotatably about a pair of axes parallel to the axes of the pair of roller electrodes, the two pairs of retainer rollers squeezing the two plate-like workpieces in the direction of thickness while the two plate-like workpieces are squeezed by the pair of roller electrodes; and a squeezing force applying device for applying to the two pairs of retainer rollers squeezing forces for generating friction forces enough to resist expanding forces of the two plate-like workpieces which are generated during welding thereof by the pair of roller electrodes. In this case, the movements of the edge portions of the plate-like workpieces away from each other in the welding step are prevented, whereby the accuracy of the welding position is effectively improved.

It is also preferable that the seam welding apparatus further comprises a pressing device for pressing portions of the plate-like workpieces which are located between the roller electrodes and the retainer rollers in an axial direction of the roller electrodes and at which convex deformation is expected to take place. This arrangement prevents the movements of the edge portions of the plate-like workpieces away from each other due to the convex deformation of the plate-like workpieces, and is therefore effective to prevent the resulting difficulty in forming the weld nugget within the two plate-like workpieces.

It is also preferable that the presser device includes auxiliary rollers which are disposed between the roller electrodes and the retainer rollers in the axial direction of the roller electrodes, rotatably about axes parallel to the axes of the roller electrodes, for pressing the plate-like workpieces while permitting the plate-like workpieces to be fed in the feeding direction, or alternatively auxiliary skids which are disposed between the roller electrodes and the retainer rollers in the axial direction of the roller electrodes, for sliding contact with the plate-like workpieces.

It is also preferable that the seam welding apparatus further comprises an electrode driving device for rotating the roller electrodes so as to transfer a driving force to the plate-like workpieces in the feeding direction. In this case, the driving force for feeding the plate-like workpieces is transferred from the roller electrodes to the plate-like workpieces, so as to restrict the expanding force of the pair of plate-like workpieces, which would cause movements of the edge portions of the plate-like workpieces away from each other. Thus, the present arrangement is effective to prevent the difficulty in forming the weld nugget within the two plate-like workpieces.

It is also preferable that the seam welding apparatus further comprises a coolant supply device for supplying a coolant fluid to portions of the plate-like workpieces which are squeezed by the roller electrodes, for cooling portions of the plate-like workpieces which are heated by seam welding by the roller electrodes. In this instance, the supply of the coolant fluid is effective to reduce the expanding force of the pair of plate-like workpieces which is generated due to heat at the weld nugget formed within the plate-like workpieces between the roller electrodes upon application of the electric current between the roller electrodes. Thus, the present arrangement is effective to prevent the difficulty in forming the weld nugget within the two plate-like workpieces between the roller electrodes.

BEST MODE FOR CARRYING OUT THE INVENTION

Figure 1:
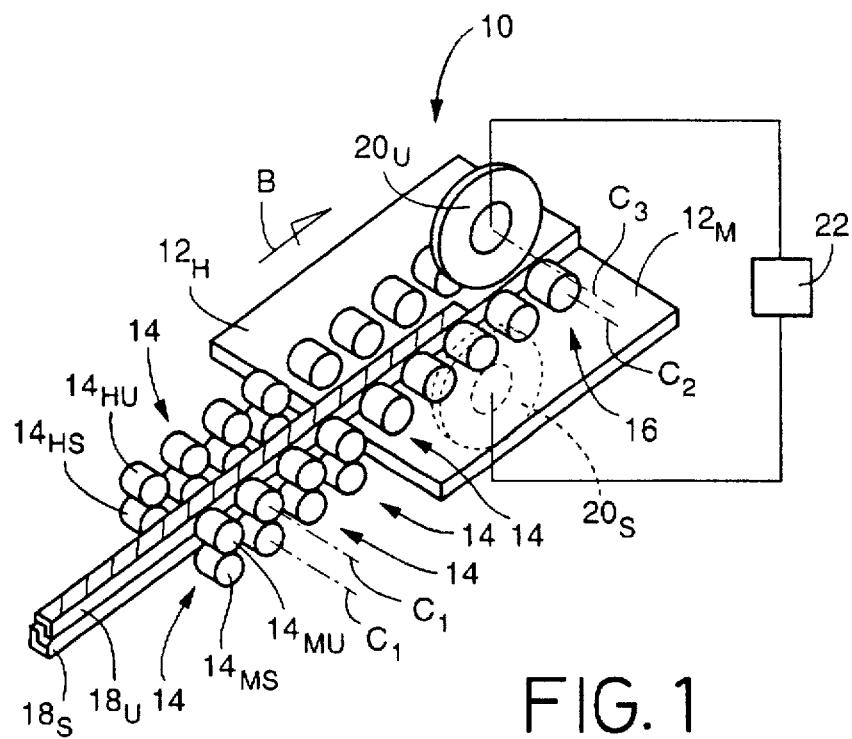
FIG. 1 is a perspective view schematically showing a manner of feeding plate-like workpieces to explain a seam welding process of the present invention.

There will be described embodiments of this invention in detail referring to the drawings. FIG. 1 through FIG. 6 are views explaining a seam welding process to be practiced according to this invention, while FIG. 5 through FIG. 9 are views explaining a seam welding apparatus 10 adapted to practice the seam welding process.

Figure 2:
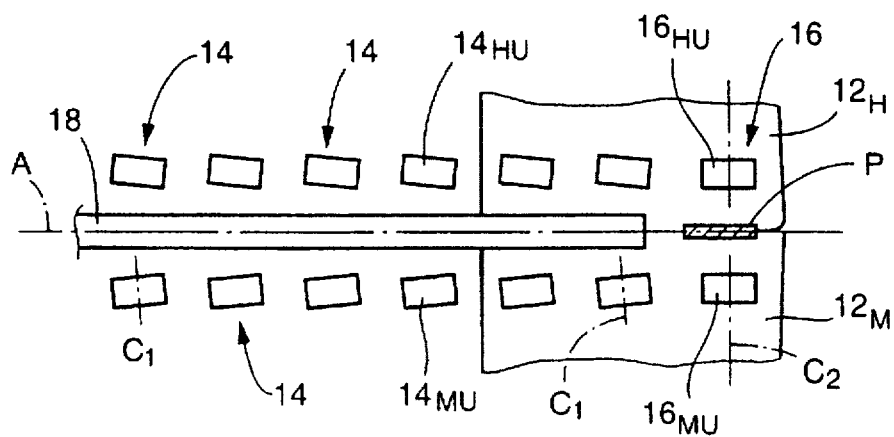
FIG. 2 is a plan view explaining an arrangement of guide rollers and retainer rollers used for feeding the plate-like workpieces, to explain the seam welding process according to the embodiment of FIG. 1.

In FIGS. 1 and 2, there are shown a pair of left and right plate-like workpieces $12_H$, $12_M$ which are separate plates such as zinc steel plates having given shapes. These plate-like workpieces $12_H$, $12_M$ are fed in a predetermined feeding direction B by a plurality of sets of guide rollers 14 (Feeding Step), while the two plate-like workpieces $12_H$, $12_M$ are guided and positioned relative to each other by a pair of upper and lower plate-like guide members $18_U$, $18_S$ in sliding contact with guide surfaces $24_U$, $24_S$ such that edge portions of the plate-like workpieces $12_H$, $12_M$ overlap each other with a predetermined lap amount (lap width) S (Guiding Step). The thus positioned two plate-like workpieces $12_H$, $12_M$ are squeezed under pressure at their overlapping edge portions, by a pair of upper and lower roller electrodes $20_U$, $20_S$. In this condition, an electric current supplied from a power source is applied between the pair of roller electrodes $20_U$, $20_S$, whereby the two plate-like workpieces $12_H$, $12_M$ are welded together at their overlapping edge portions, along a welding centerline A which is parallel to the feeding direction B and which passes a center of the lamp width S of the overlapping edge portions (Welding Step). A set of retainer rollers 16 are disposed on opposite sides of the roller electrodes $20_U$, $20_S$, for holding the pair of plate-like workpieces $12_H$, $12_M$ under welding, with a predetermined squeezing force in the direction of thickness of the workpieces, so as to prevent movement of the workpieces away from each other (Holding Step).

Each of the above-indicated sets of guide rollers 14 consists of a pair of upper and lower guide rollers $14_{HU}$, $14_{HS}$ disposed to pinch the plate-like workpiece $12_H$ with a predetermined pinching force in the direction of thickness of the workpiece, and another pair of upper and lower guide rollers $14_{MU}$, $14_{MS}$ disposed to pinch the other plate-like workpiece $12_M$ with a predetermined pinching force in the direction of thickness of the workpieces. The sets of guide rollers 14 are arranged in the feeding direction B, and include at least one set of guide rollers 14 which are positively driven. Each guide roller $14_{HU}$, $14_{HS}$, $14_{MU}$, $14_{MS}$ of each set is supported rotatably about a horizontal axis C1 which lies in a plane inclined a suitable angle θ with respect to a plane perpendicular to the welding centerline A and which is located above or below the welding centerline A. Each pair of upper and lower guide rollers $14_{HU}$ and $14_{HS}$, or $14_{MU}$ and $14_{MS}$ is given a suitable pinching force by a cylinder device $56_H$, $56_M$ described below, for example, such that the pinching force acts on the upper and lower guide rollers in a direction toward each other. The pinching force is determined so as to generate a friction force enough to permit the upper and lower rollers to generate a force $F_R$ consisting of a component $F_{R2}$ for feeding the plate-like workpiece $12_H$, $12_M$ in the feeding direction B and a component $F_{R1}$ for moving the workpiece in the direction toward the guide members $18_U$, $18_S$ as described below by reference to FIG. 4.

The above-indicated set of retainer rollers 16 consists of a pair of upper and lower retainer rollers $16_{HU}$, $16_{HS}$ which are disposed on one side of the roller electrodes $20_U$, $20_S$ to hold the plate-like workpiece $12_H$ with a predetermined squeezing force in the direction of thickness of the workpiece, and another pair of upper and lower retainer rollers $16_{MU}$, $16_{MS}$ disposed on the other side of the roller electrodes $20_U$, $20_S$ to hold the other plate-like workpieces $12_M$ with a predetermined squeezing force in the direction of thickness of the workpiece. Thus, the two pairs of retainer rollers 16 are disposed such that the roller electrodes $20_U$, $20_S$ are interposed between the retainer rollers 16. Each pair of upper and lower retainer rollers $16_{HU}$ and $16_{HS}$, or $16_{MU}$ and $16_{MS}$ is given a comparatively large squeezing force by a cylinder device similar to the cylinder device $56_H$, $56_M$ described below, for example, such that the squeezing force acts on the upper and lower retainer rollers in a direction toward each other. The squeezing force is determined so as to prevent the edge portions of the pair of plate-like workpieces $12_H$, $12_M$ under welding from moving away from each other. Each retainer roller $16_{HU}$, $16_{HS}$, $16_{MU}$, $16_{MS}$ is supported rotatably about a horizontal axis C2 which lies in a plane perpendicular to the welding centerline A and which is located above or below the welding centerline A. The plate-like workpieces $12_H$, $12_M$ under feeding, namely, under welding are retained by the above-indicated squeezing force to prevent the movements of their edge portions away from each other (Holding Step).

Each of the above-indicated pair of roller electrodes $20_U$, $20_S$ is supported rotatably about a horizontal axis C3 which lies in a plane perpendicular to the welding centerline A and which is located above or below the welding centerline A. The pair of roller electrodes $20_U$, $20_S$ is given a comparatively large squeezing force by a cylinder device by a cylinder device 80 described below, for example, such that the squeezing force acts on the roller electrodes in a direction toward each other. The squeezing force is determined so as to permit the overlapping edge portions of the plate-like workpieces $12_H$, $12_M$ to be mashed by an amount enough to reduce the overall lap thickness to the approximate thickness of one of the workpieces $12_H$, $12_M$. The squeezing portion of the roller electrodes $20_U$, $20_S$ is indicated at P in FIG. 2.

Figure 3:
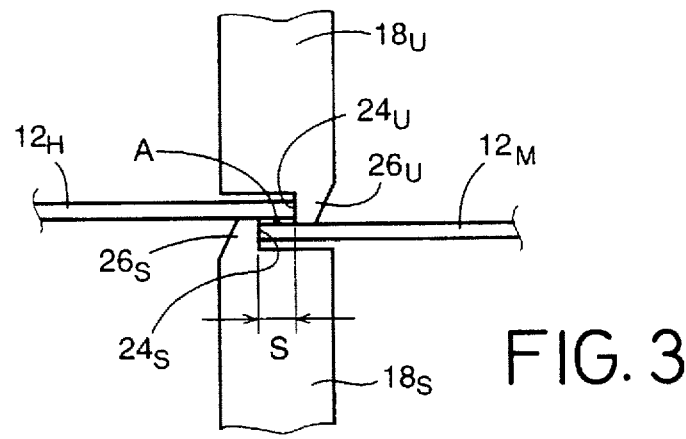
FIG. 3 is a view showing portions of guide members by which the plate-like workpieces are slidably guided, to explain a workpiece guiding step in the embodiment of FIG. 1.

As shown in detail in FIG. 3, the above-indicated plate-like guide members $18_U$, $18_S$ are disposed with a predetermined amount of gap left between mutually opposed end faces thereof, so as to extend along the welding centerline A and between the pair of upper and lower guide rollers $14_{HU}$, $14_{HS}$ for holding the one plate-like workpiece $14_{GH}$, and the pair of upper and lower guide rollers $14_{MU}$, $14_{MS}$ for holding the other plate-like workpiece $12_M$, such that one of longitudinal ends of the guide members 18U, 18S is spaced apart by a predetermined small distance from the pair of roller electrodes $20_U$, $20_S$ in the longitudinal direction. The upper guide member $18_U$ has a projecting rail $26_U$ formed at a portion of its end face on the side of the plate-like workpiece $12_M$. The projecting rail $26_U$ has a guide surface $24_U$ for sliding contact with the end face of the plate-like workpiece $12_H$. The lower guide member $18_S$ has a projecting rail $26_S$ formed at a portion of its end face on the side of the plate-like workpiece $12_H$. The projecting rail $26_S$ has a guide surface $24_S$ for sliding contact with the end face of the plate-like workpiece $12_M$.

Figure 4:
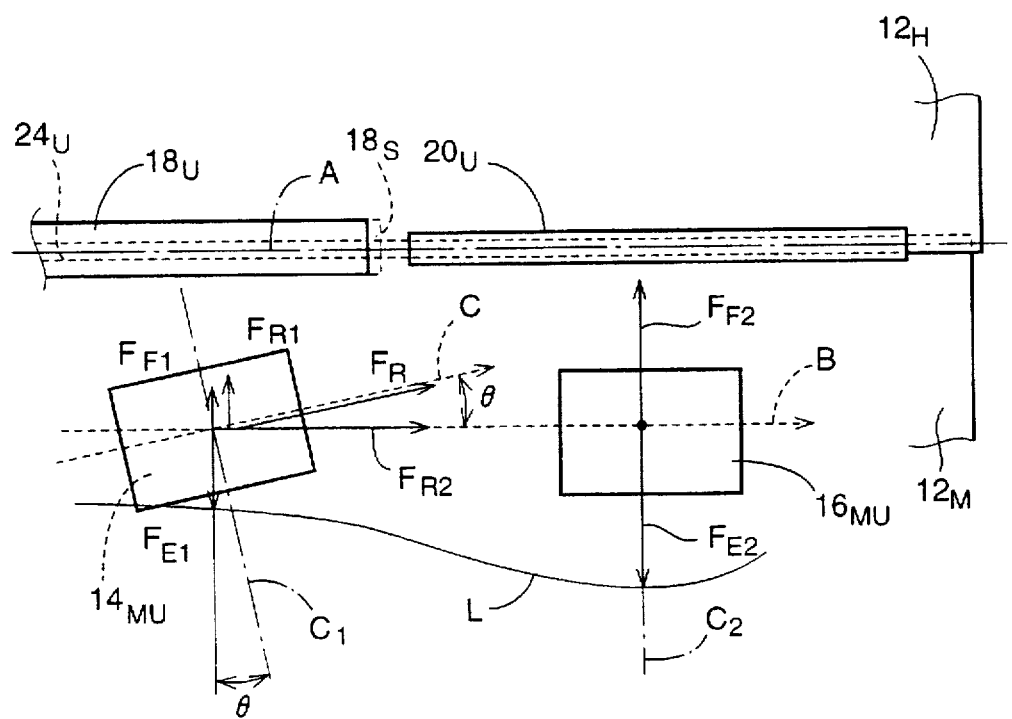
FIG. 4 is a view explaining operations of the guide rollers and retainer rollers used in workpiece guiding and holding steps in the embodiment of FIG. 1.

As shown in detail in FIG. 4, the rotation axis C1 of at least one set (all sets in this embodiment) of the guide rollers 14 disposed on the left and right sides of the guide members $18_U$, $18_S$ is inclined a predetermined small angle θ (1°–3° in this embodiment) with respect to the line perpendicular to the welding centerline A, so that the plate-like workpieces $12_H$, $12_M$ are driven or guided by the guide roller 14 in a direction (in the direction of the driving force $F_R$ described below) which is inclined inwardly by the predetermined angle θ with respect to the feeding direction B.

When the guide roller $14_{MU}$ is rotated while the plate-like workpiece $12_M$ is in abutting contact with the guide surface $24_S$, for example, the driving force $F_R$ produced by the guide roller $14_{MU}$ consists of a component $F_{R1}$ which acts in the direction perpendicular to the feeding direction B, toward the welding centerline A or guide surface $24_S$, and a component $F_{R2}$ which acts in the direction parallel to the feeding direction B. Accordingly, the plate-like workpiece $12_M$ is fed while it is forced against the guide surface $24_S$. Similarly, the plate-like workpiece $12_H$ is fed while it is forced against the guide surface $24_U$. Thus, the pair of plate-like workpieces $12_H$, $12_M$ are positioned relative to each other with their edge portions overlapping over the predetermined lap width S, before the workpieces are squeezed by the upper and lower roller electrodes $20_U$, $20_S$. In this arrangement, the pair of plate-like workpieces $12_H$, $12_M$ are automatically positioned relative to each other during feeding thereof through a feeding path, even if the workpieces do not have the predetermined relative position when they are introduced into the feeding path.

When the overlapping edge portions of the two plate-like workpieces $12_H$, $12_M$ are squeezed or mashed by the pair of upper and lower roller electrodes $20_U$, $20_S$, there is generated an expanding force which causes the overlapping edge portions to be moved in a direction away from each other. This expanding force increases in the feeding direction B from a position upstream of the roller electrodes $20_U$, $20_S$ toward the roller electrodes, and is the largest at the position aligned with the rotation axis C2 of the roller electrodes, as indicated by line L in FIG. 4. On the other hand, the retainer rollers 16 squeezing the plate-like workpieces $12_H$, $12_M$ generate an inward friction force corresponding to the squeezing force of the retainer rollers 16, as a reaction force opposing the expanding force.

The expanding movement of the pair of plate-like workpieces $12_H$, $12_M$ away from each other can be prevented when the above-indicated friction force is equal to or larger than the expanding force. At the guide rollers 14 disposed on the opposite sides of the guide members $18_U$, $18_S$, however, the force component $F_{R1}$ acts on the plate-like workpieces in the direction toward the guide members $18_U$, $18_S$, so that the friction force $F_{F1}$ required at the position of each guide roller 14 is equal to the expanding force $F_{E1}$ minus the component $F_{R1}$, namely, $F_{F1} \geq F_{E1} - F_{R1}$. The component $F_{R1}$ does not act on a portion of the plate-like workpieces $12_H$, $12_M$ at which the workpieces are held by the retainer rollers 16 disposed on the opposite sides of the roller electrodes $20_U$, $20_S$, so that the friction force $F_{F2}$ required at the position of the retainer rollers 16 is equal to or larger than the expanding force $F_{E2}$, namely, $F_{F2}/F_{E2}$.

To prevent the expanding movement of the pair of plate-like workpieces $12_H$, $12_M$ away from each other, therefore, the friction forces $F_{F1}$, $F_{F2}$, that is, the squeezing forces of the guide rollers 14 and the retainer rollers 16 are determined so as to satisfy a relationship $F_{F1}/F_{E1} - F_{R1}$ on the opposite sides of the guide members $18_U$, $18_S$, and a relationship $F_{F2}/F_{E2}$ on the opposite sides of the roller electrodes $20_U$, $20_S$, respectively. In the present embodiment, the rotation axis C2 of each retainer roller 16 is determined to be perpendicular to the feeding or welding direction B, so that the guiding direction of the retainer rollers is parallel to the feeding direction. This arrangement facilitates the control of forces for stable adjustment of the predetermined lap amount, since only the friction force of the retainer rollers 16 should be considered in addition to the expanding force.

Figure 5:
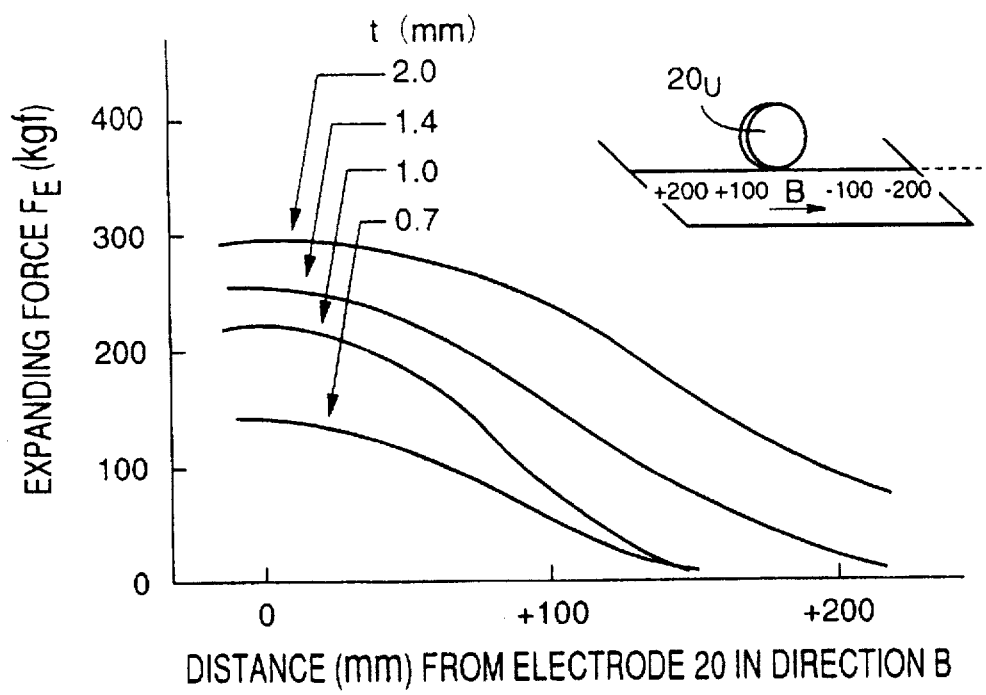
FIG. 5 is a view explaining a relationship between an expanding force generated in a welding step and a distance from roller electrodes, in the embodiment of FIG. 1.
Figure 6:
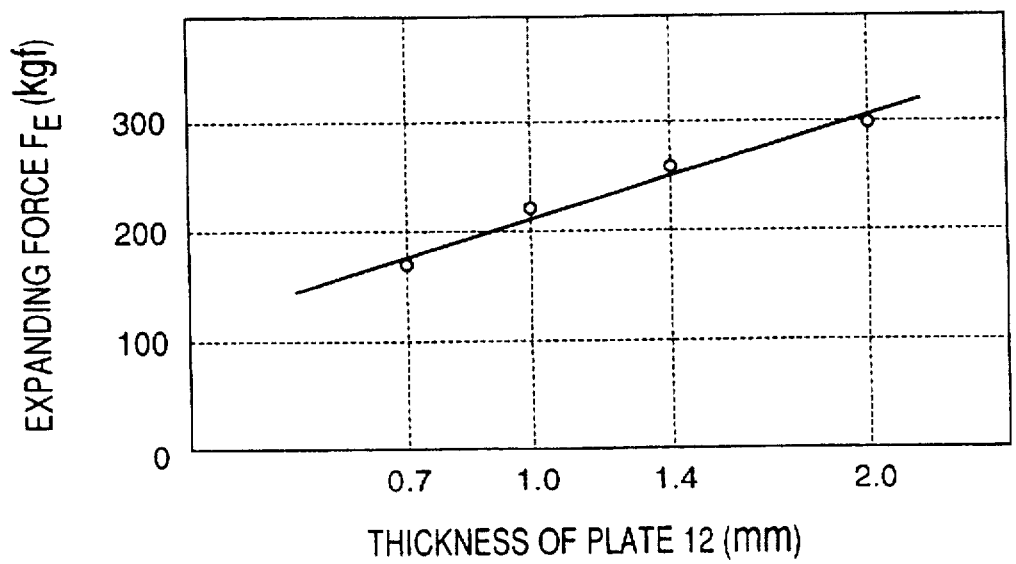
FIG. 6 is a view explaining a relationship between the expanding force generated in the welding step and the thickness of the plate-like workpieces squeezed by the roller electrodes.

FIG. 5 shows an influence of plate thickness t of the plate-like workpieces on the distribution of the expanding force, while FIG. 6 shows an influence of the plate thickness t on the maximum expanding force at the positions of the roller electrodes $20_U$, $20_S$. In the case of steel plates which are generally used for the manufacture of automobiles, the expanding force is zero at a position 150 mm distant from the roller electrodes $20_U$, $20_S$ in the upstream direction, when the thickness t is 1.0 mm or smaller, as indicated in FIG. 5. Accordingly, the squeezing forces of the guide rollers 14 at the positions upstream of the above-indicated position are determined so as to permit the pair of plate-like workpieces $12_H$, $12_M$ to be fed in the feeding direction B. It is also noted that the maximum expanding force at the positions of the roller electrodes $20_U$, $20_S$ increases in linear proportion to the plate thickness as indicated in FIG. 6. Therefore, the required squeezing force of the retainer rollers 16 is automatically determined by the plate thickness.

Figure 7:
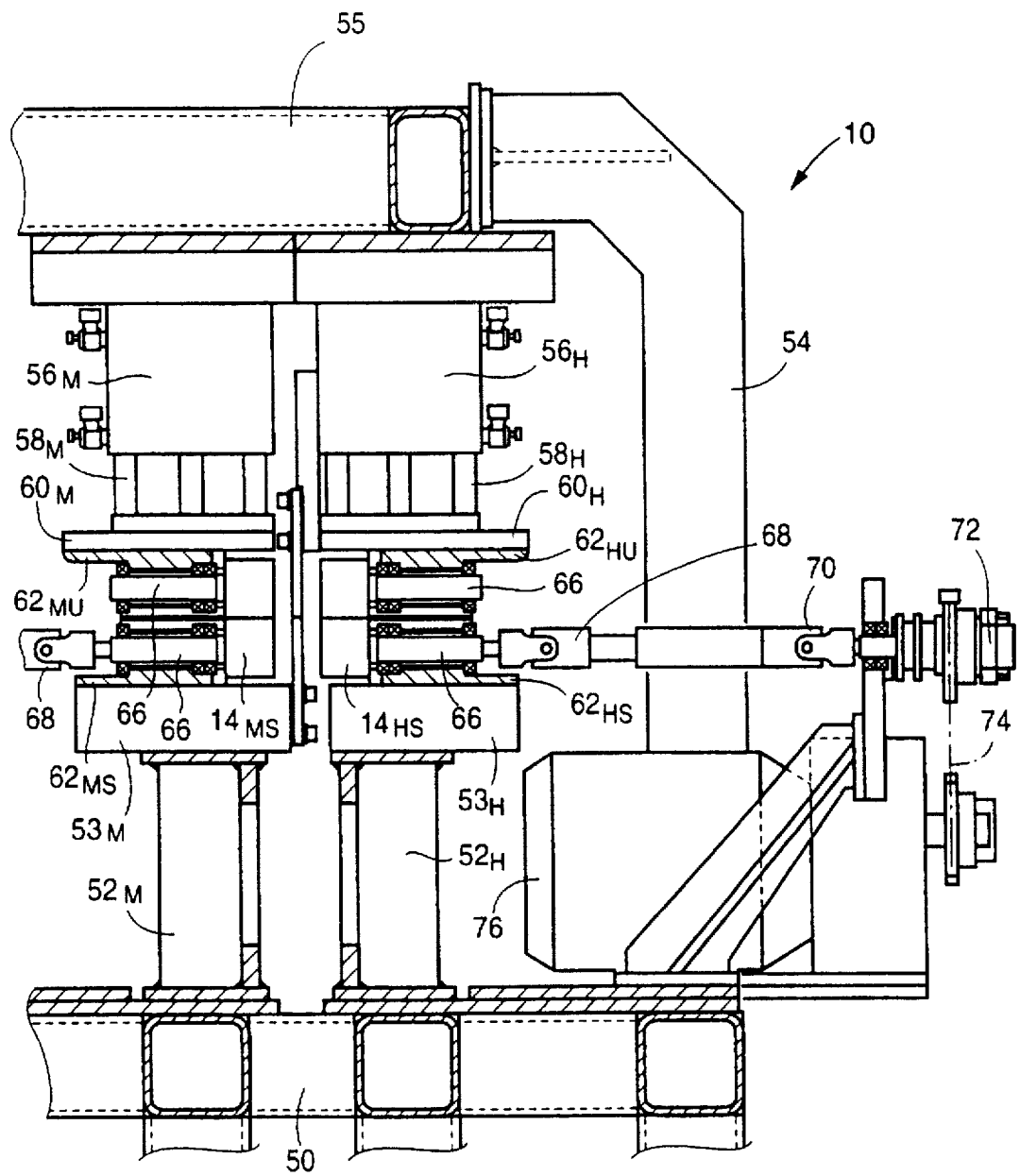
FIG. 7 is a view in cross section showing the guide rollers and their vicinity of a seam welding apparatus suitable for practicing the seam welding process of FIG. 1, taken in a plane perpendicular to a feeding direction of the plate-like workpieces.
Figure 8:
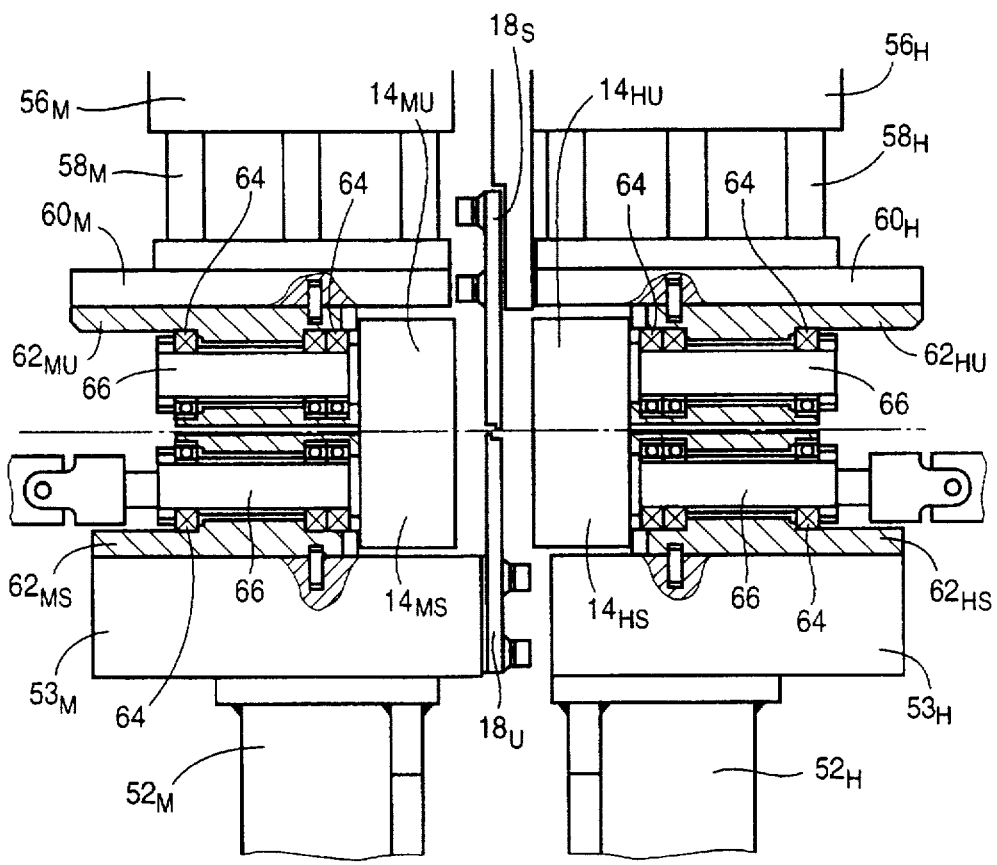
FIG. 8 is a view showing in enlargement a portion of the seam welding apparatus of FIG. 7.
Figure 9:
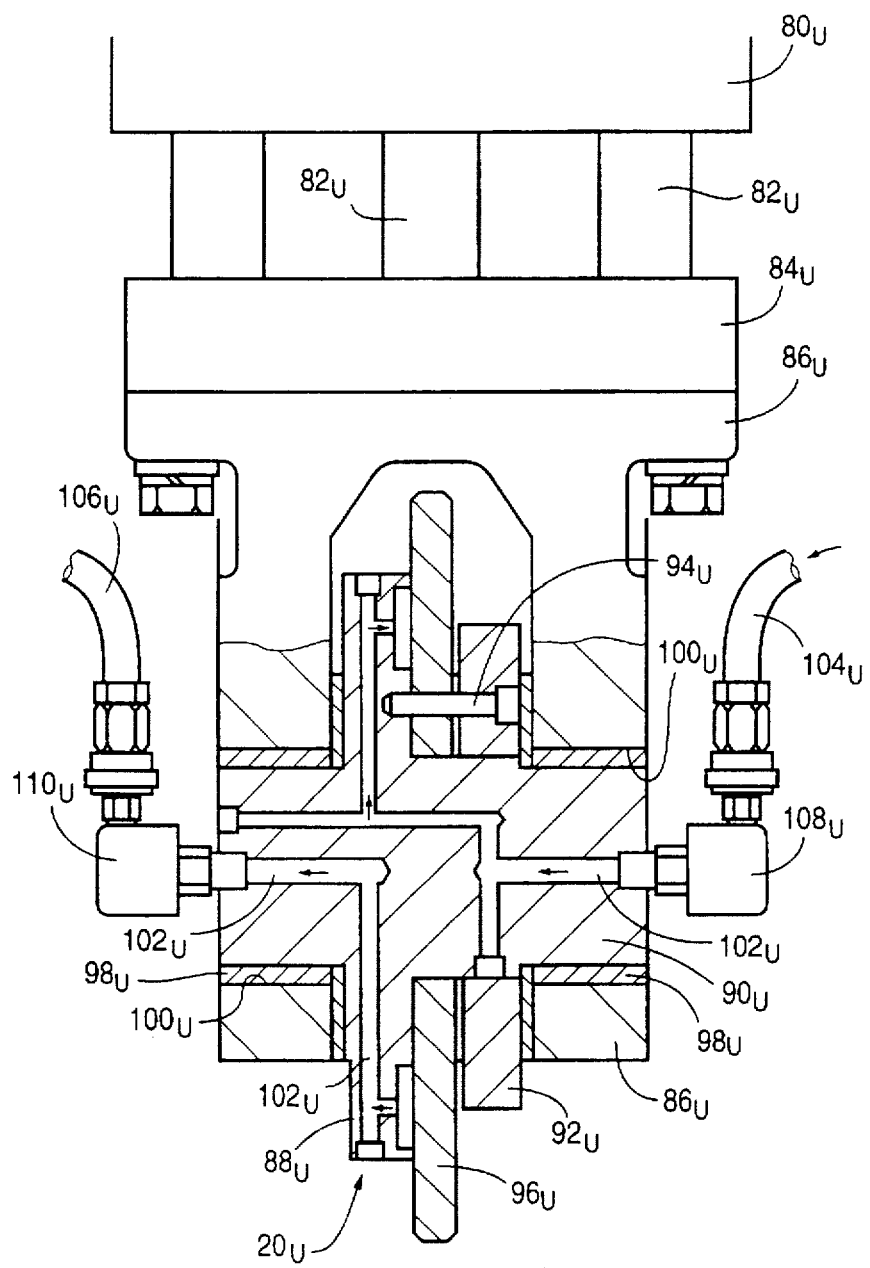
FIG. 9 is a partly cut-away view explaining the roller electrodes and their vicinity of the seam welding apparatus of FIG. 7.

The mash seam welding apparatus 10 for practicing the mash seam welding process explained above is constructed as shown in FIGS. 7–9. FIG. 7 is a cross sectional view perpendicular to the feeding direction, showing the guide rollers 14 and their vicinity of the mash seam welding apparatus 10. FIG. 8 is a view showing in enlargement the guide rollers 14 and their vicinity, while FIG. 9 is a partly cut-away view explaining the support structure for the roller electrode $20_U$.

Since the guide rollers 14 and the retainer rollers 16 are basically identical in construction to each other, the construction of the guide rollers 14 and the support structure thereof will be described by way of example.

Referring to FIGS. 7 and 8, a base frame 50 extends in the welding direction B, and a pair of posts $52_H$, $52_M$ are disposed upright on the base frame 50. On the upper end faces of the posts $52_H$, $52_M$, there are provided the guide rollers $14_{HS}$, $14_{MS}$ via base blocks $53_H$, $53_M$. A top frame 55 is fixed to the base frame 50 through an outer frame 54. To the top frame 55, there are fixed a pair of left and right cylinder devices $56_H$, $56_M$ for giving the pinching forces to the pair of upper and lower guide rollers $14_{HU}$, $14_{HS}$ and the pair of upper and lower guide rollers $14_{MH}$, $14_{MS}$, respectively. Movable rods $58_H$, $58_M$ extend downward from the cylinder devices $56_H$, $56_M$, such that the movable rods $58_H$, $58_S$ are movable. To the lower ends of the movable rods $58_H$, $58_M$, there are fixed movable plates $60_H$, $60_M$ on which the guide rollers $14_{HU}$, $14_{MU}$.

The set of guide rollers $14_{HS}$, $14_{MS}$, $14_{HU}$, $14_{MU}$ are provided with respective integrally formed shafts 66 which are supported by respective shaft cases $62_{HS}$, $62_{MS}$, $62_{HU}$, $64_{MU}$ through bearings 64. The above-indicated shaft cases $62_{HS}$, $62_{MS}$ are fixed to the upper end faces of the posts $52_H$, $52_M$, while the above-indicated shaft cases $62_{HU}$, $62_{MU}$ are fixed to the movable plates $60_H$, $60_M$. The guide rollers $14_{HS}$, $14_{MS}$, are rotatable about the axis C1 located below the welding centerline A, while the guide rollers $14_{HU}$, $14_{MU}$ are rotatable about the axis C1 located above the welding centerline A. As shown in FIG. 3, the guide members $18_U$, $18_S$ are fixed to the cylinder device $56_H$ and the post $52_M$, respectively, such that the guide members $18_U$, $18_S$ are disposed with the predetermined amount of gap left between their mutually opposed end faces, and extend between the pair of upper and lower guide rollers $14_{HU}$, $14_{HS}$ for holding the one plate-like workpiece $14_H$, and the pair of upper lower guide rollers $14_{MU}$, $14_{MS}$ for holding the other plate-like workpiece $12_M$, such that the welding centerline A is aligned with the widthwise centers of the opposed end faces of the guide members $18_U$, $18_S$.

Each of the shafts 66 of the lower guide rollers $14_{HS}$, $14_{MS}$ is connected to a drive motor 76 through a pair of joints 68, 70, an intermediate shaft 72, and a chain 74. The intermediate shaft 72 is provided for each of the left and right guide rollers $14_{HS}$, $14_{MS}$ of each set of guide rollers 14, and these intermediate shafts 72 are connected to each other by chains and to the drive motor 76, for simultaneous rotation at the same speed. In this arrangement, the lower rollers $14_{HS}$, $14_{MS}$ of the guide rollers 16 are rotated by the drive motor 76 to feed the pair of plate-like workpieces $14_{HS}$, $14_{MS}$. In the present embodiment, the drive motors 76 function as a driving device for rotating the guide rollers 14. Similar drive motors are used as a driving device for rotating the retainer rollers 16.

The pairs of upper and lower guide rollers $14_{HU}$, $14_{HS}$, $14_{MU}$, $14_{MS}$ are steel rollers whose outer circumferential surfaces are covered by an elastic material such as urethane rubber. The pair of guide rollers $14_{HU}$, $14_{HS}$ and the pair of guide rollers $14_{MU}$, $14_{MS}$ are squeezed toward each other by the respective cylinder devices $56_H$, $56_M$ which function as a squeezing force applying device, so that the squeezing forces acting on the guide rollers permit the generation of friction forces enough to generate the component for feeding the pair of plate-like workpieces $12_H$, $12_M$ and the component for forcing the workpieces toward the guide members $18_U$, $18_S$.

The pair of upper and lower retainer rollers $16_{HU}$, $16_{HS}$ and the pair of upper and lower retainer rollers $16_{MU}$, $16_{MS}$ which constitute one set of retainer rollers 16 are constructed similarly to the guide rollers $14_{HU}$, $14_{HS}$, $16_{MU}$, $14_{MS}$, as described below by reference to FIG. 15. The retainer rollers 16 are rotatable about the respective rotation axes C2 described above, and are rotated by the drive motors 76 at the same peripheral speed as the guide rollers $14_{HS}$, $14_{MS}$. The pair of upper and lower retainer rollers $16_{HU}$, $16_{HS}$ and the pair of upper and lower retainer rollers $16_{MU}$, $17_{MS}$ are steel rollers whose outer circumferential surfaces are knurled to increase the generated friction forces in their axial direction, with respect to the plate-like workpieces $12_H$, $12_M$. The retainer rollers $16_{HS}$, $16_{HU}$ and the retainer rollers $16_{MS}$, $16_{MU}$ are squeezed toward each other by cylinder devices similar to the cylinder devices $56_H$, $56_M$, which also function as a squeezing force applying device. The squeezing forces given to the retainer rollers 16 are comparatively large permitting the generation of friction forces on their outer circumferential surfaces, so as to prevent the movements of the edge portions of the pair of plate-like workpieces $12_H$, $12_M$ under welding in the directions away from each other.

Figure 15:
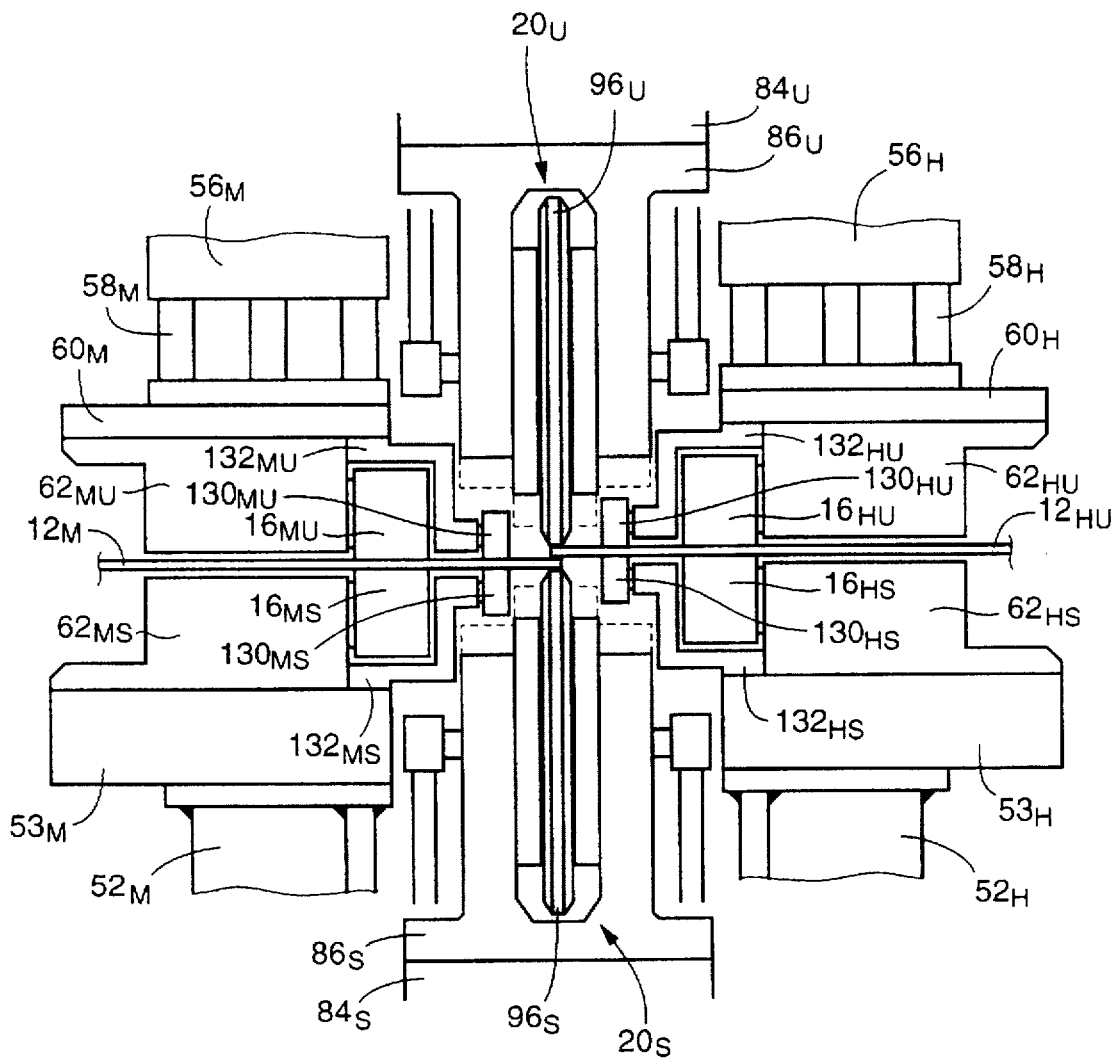
FIG. 15 is a view explaining electrode rollers and retainer rollers and their vicinity in another embodiment of this invention.

The pair of roller electrodes $20_U$, $20_S$ have the same construction, as shown in FIG. 15, and only the upper roller electrode $20_U$ will be explained by reference to FIG. 9, which is a partly cut-away view showing the upper roller electrode $20_U$ and the support structure of this electrode. As shown in FIG. 9, a cylinder device $80_U$ is fixed to the above-described top frame 55, for giving the roller electrodes $20_U$, $20_S$ a squeezing force. The cylinder device $80_U$ is provided with movable rods $82_U$ extending downward such that the movable rods $82_U$ are movable. A movable plate 84 is fixed to the ends of the movable rods $82_U$, and a support block 86 for rotatably supporting the roller electrode $20_U$ is fixed to the movable plate 84.

The roller electrode $20_U$ comprised of a rotary shaft $90_U$ with a flange portion $88_U$ integrally formed at an axially intermediate part thereof, and a circular electrode disk $96_U$ fastened by a screw $94_U$ to the flange portion $88_U$ together with a pressure plate $92_U$. The rotary shaft $90_U$ is fitted at its opposite end portions through power supply bushings $98_U$, in a through-hole $100_U$ formed through the above-indicated support block 86U, whereby the rotary shaft $90_U$ is rotatably supported by the support block $86_U$. The above electrode disk $96_U$ is a highly electrically conductive body formed of a metallic material such as chromium steel, beryllium copper alloy or chromium zirconium copper alloy, which is highly durable with a small amount of wear or damage even in the presence of a comparatively large electric current applied thereto while the metallic material is in contact with the plate-like workpieces $12_H$, $12_M$. The rotary shaft $90_U$, pressure plate $92_U$, power supply bushings $98_U$ and support blocks $86_U$ are highly electrically conductive bodies formed of a metallic material such as copper alloy or aluminum alloy. The electric current is supplied from the above-indicated power source 22 to the electrode disk $96_U$ through electric wires not shown, and through the power supply bushings 98, rotary shaft $90_U$, etc.

A fluid passage $102_U$ is formed through the above-indicated rotary shaft $90_U$ such that the fluid passage $102_U$ is open in the opposite end faces of the rotary shaft $90_U$ and has an intermediate portion in the form of a circular recess formed in the surface of the flange portion $88_U$ which contacts the electrode disk $96_U$. A pair of hose joints $108_U$, $110_U$ are fixed to the end faces of the rotary shaft $90_U$, for connecting the fluid passage $102_U$ to coolant fluid hoses $104_U$, $106_U$ while permitting the rotary shaft $90_U$ to rotate.

Figure 10:
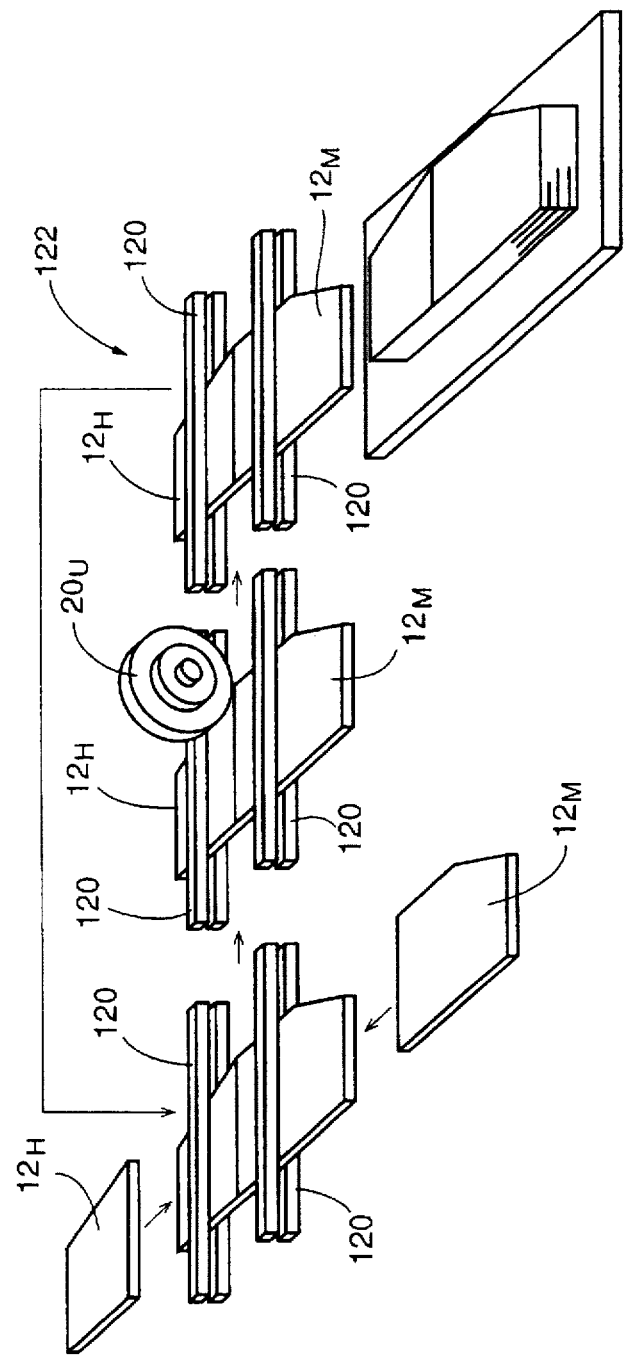
FIG. 10 is a perspective view explaining steps of a conventional seam welding process using a clamping mechanism for clamping together a pair of plate-like workpieces.
Figure 13:
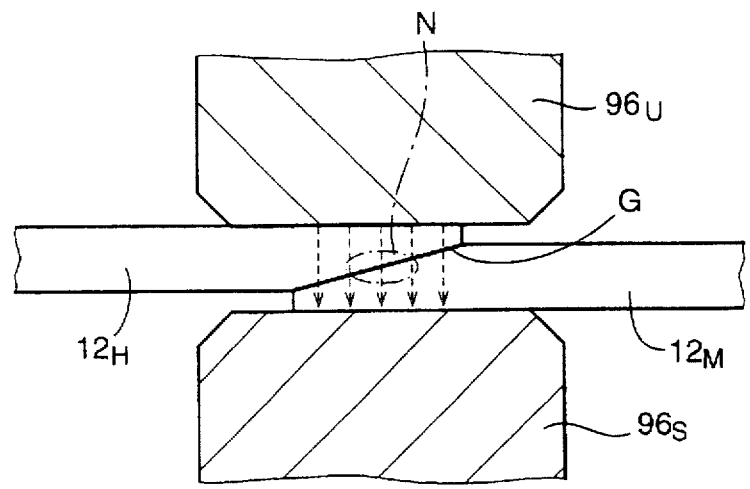
FIG. 13 is a view explaining a state of seam welding where the convex deformation F shown in FIG. 11 does not occur.

In the mash seam welding apparatus 10 constructed as described above, the plurality of sets of guide rollers 14 and the one set of retainer rollers 16 are continuously rotated by the drive motors 76, so that the pair of plate-like workpieces $12_H$, $12_M$ are fed and positioned relative to each other by the guide rollers 14 and the guide members $18_U$, $18_S$ such that the edge portions of the workpieces overlap each other over the predetermined lap width S. Then, the workpieces are squeezed and mashed by the pair of roller electrodes $20_U$, $20_S$, and a welding current is simultaneously applied between the roller electrodes $20_U$, $20_S$, whereby the workpieces are welded at their edge portions as shown in FIG. 13, for example, as described below. Therefore, the present embodiment does not require a mechanism as provided in the apparatus shown in FIG. 10, for instance, for returning the upper and lower clamping members 120 after removal thereof from the welded plate-like workpieces $12_H$, $12_M$. The apparatus of FIG. 10 uses the clamping mechanism 122 for moving the pair of plate-like workpieces $12_H$, $12_M$ to the pair of roller electrodes $20_U$, $20_S$ while the workpieces are held by the upper and lower claiming members 120 such that the edge portions of the workpieces overlap each other. Accordingly, the seam welding apparatus according to the present embodiment is less complicated and smaller is size than the apparatus of FIG. 10. Further, the present embodiment is free from deterioration of seam welding efficiency due to movements of the roller electrodes $20_U$, $20_S$, and permits higher seam welding efficiency than in an apparatus adapted to reciprocate the roller electrodes $20_U$, $20_S$ relative to the upper and lower clamping members 120.

Further, the present embodiment uses the guide members $18_U$, $18_S$ which are fixedly disposed upstream of the roller electrodes $20_U$, $20_S$ and which have the pair of guide surfaces $24_U$, $24_S$ parallel to the direction perpendicular to the axial direction of the pair of roller electrodes $20_U$, $20_S$. When the two plate-like workpieces $12_H$, $12_M$ are fed, these workpieces are positioned relative to each other such that the end faces of the overlapping edge portions are in sliding contact with the respective guide surfaces $24_U$, $24_S$. Thus, the present embodiment assures improved positioning accuracy of the overlapping edge portions of the two plate-like workpieces $12_H$, $12_M$, with a simple structural arrangement.

In the present embodiment, at least two pairs of guide rollers $14_{HU}$ and $14_{HS}$, $14_{MU}$ and $14_{MS}$ are provided on the opposite sides of the guide members $18_U$, $18_S$, for pinching the two plate-like workpieces $12_H$, $12_M$ in the direction of thickness of the workpieces, and for guiding the two plate-like workpieces $12_H$, $12_M$ such that the workpieces are moved toward the guide surfaces $24_U$, $24_S$ of the guide members $18_U$, $18_S$ as the workpieces are fed toward the roller electrodes $20_U$, $20_S$, so that the end faces of the edge portions of the two plate-like workpieces $12_H$, $12_M$ are held in sliding contact with the guide surfaces $24_U$, $24_S$. Thus, the two plate-like workpieces $12_H$, $12_M$ are forced onto the guide surfaces $24_U$, $24_S$ of the guide members $18_U$, $18_S$ as the workpieces are fed by the two pairs of guide rollers $14_{HU}$, $14_{HS}$, $14_{MU}$, $14_{MS}$. This arrangement is advantageous for a reduced number of sliding portions, than in a guiding arrangement which uses inclined guide plates for forcing the plate-like workpieces $12_H$, $12_M$ onto the guide surfaces $24_U$, $24_S$ of the guide members $18_U$, $18_S$.

The present embodiment is adapted to weld the two plate-like workpieces $12_H$, $12_M$ at their edge portions while the edge portions are squeezed to be mashed by and between the pair of roller electrodes $20_U$, $20_S$. Accordingly, it is not necessary to chamfer the edge portions of the plate-like workpieces $12_H$, $12_M$ prior to the welding operation. It is also noted that the conventional apparatus adapted to perform a so-called mash seam welding process requires a large clamping mechanism for resisting a large expanding force generated by mashing of the two plate-like workpieces $12_H$, $12_M$ by the pair of roller electrodes $20_U$, $20_S$. However, the present apparatus is advantageous for reduced size thereof.

That is, the present embodiment is provided with the two pairs of retainer rollers $16_{HU}$ and $16_{HS}$, and $16_{MU}$ and $16_{MS}$ which are disposed on the opposite sides of the pair of roller electrodes $20_U$, $20_S$, and a squeezing force applying device (cylinder device) for applying the squeezing forces to these two pairs of retainer rollers $16_{HU}$ and $16_{HS}$, and $16_{MU}$ and $16_{MS}$. The two pairs of retainer rollers $16_{HU}$, $16_{HS}$, $16_{MU}$, $16_{MS}$ are disposed rotatably about their axes aligned with the axes of the pair of roller electrodes $20_U$, $20_S$, for squeezing the two plate-like workpieces $12_H$, $12_M$ in their direction of thickness. The squeezing forces given by the squeezing force applying device are enough to permit the retainer rollers to generate a friction force sufficient to resist the expanding force of the two plate-like workpieces $12_H$, $12_M$ generated in the welding process by the pair of roller electrodes $20_U$, $20_S$. This arrangement prevents expanding movements of the two plate-like workpieces $12_H$, $12_M$ away from each other during welding at their edge portions, and is therefore effective to improve the accuracy of the welding position.

There will next be described other embodiments of this invention. In the following embodiments, the reference numerals used in the preceding embodiment will be used to identify the corresponding elements, and no description of these elements will be provided.

Figure 11:
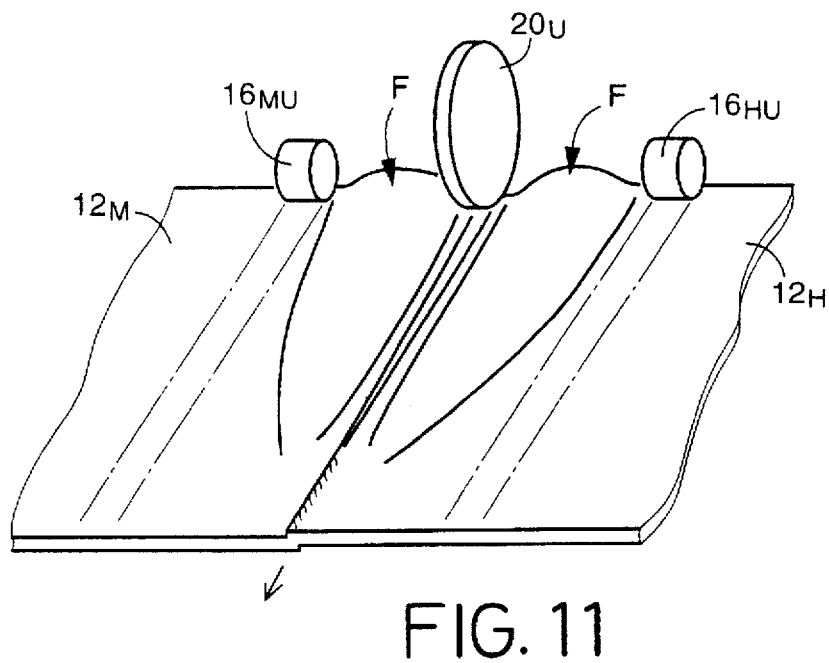
FIG. 11 is a view explaining convex deformation F of the plate-like workpieces which may occur in a seam welding process.
Figure 12:
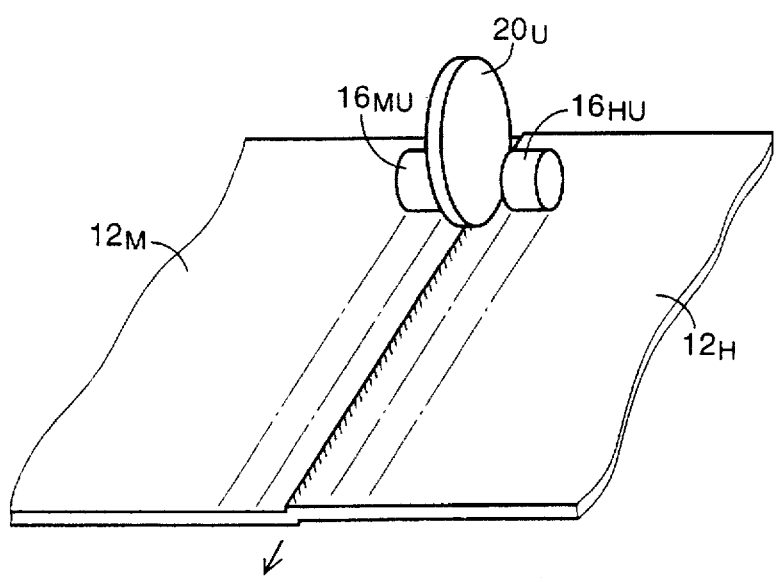
FIG. 12 is a view explaining a relationship between the convex deformation F shown in FIG. 11 and a distance between the roller electrodes and pressure rollers.
Figure 14:
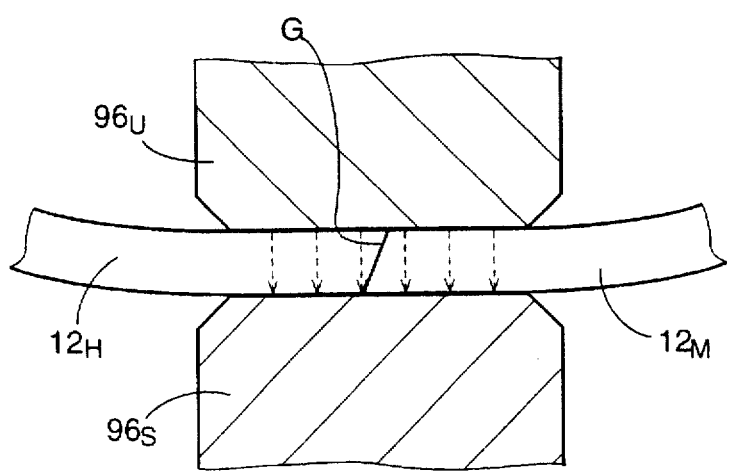
FIG. 14 is a view explaining a state of seam welding where the convex deformation F shown in FIG. 11 occurs.

In the preceding embodiment, the plate-like workpieces $12_H$, $12_M$ may undergo buckling or convex deformation F due to an expanding force generated in the axial direction of the roller electrodes $20_U$, $20_S$, between the roller electrodes $20_U$, $20_S$ and the two pairs of retainer rollers $16_{HU}$ and $16_{HS}$, and $16_{MU}$ and $16_{MS}$, as indicated in FIG. 11. Such convex deformation F is more likely to take place as the thickness of the plate-like workpieces $12_H$, $12_M$ becomes thinner. The convex deformation F tends to be less likely to take place when the two pairs of retainer rollers $16_{HU}$, $16_{HS}$, $16_{MU}$, $16_{MS}$ are located closer to the roller electrodes $20_U$, $20_S$, as shown in FIG. 12. In this respect, it is desirable to dispose the two pairs of retainer rollers $16_{HU}$, $16_{HS}$, $16_{MU}$, $16_{MS}$ as close as possible to the roller electrodes $20_U$, $20_S$. When the above convex deformation F does not take place, the edge portions of the plate-like workpieces $12_H$, $12_M$ are suitably mashed such that an interface G of the edge portions is inclined by a relatively small angle, so that a weld nugget N is formed due to the welding current, as indicated in FIG. 13, at an intermediate position in the direction of thickness of the workpieces, and near the interface G at which the electrical resistance is high. When the convex deformation F takes place, on the other hand, the edge portions of the plate-like workpieces $12_H$, $12_M$ are displaced in the right and left directions, with a result of an increase in the angle of inclination of the interface G, and a consequent increase in the area of contact of the electrode discs $96_U$, $96_S$ with the non-overlapping portions of the plate-like workpieces $12_H$, $12_M$, as indicated in FIG. 14, whereby the weld nugget is unlikely to be formed, making it difficult to achieve the seam welding. Broken lines with arrows in FIGS. 13 and 14 indicate the welding current.

However, there is an upper limit D in the distance between the retainer rollers and the roller electrodes $20_U$, $20_S$, because the support blocks 86 for supporting the roller electrodes $20_U$, $20_S$ and the other members are located near the roller electrodes, and because the support blocks $86_U$, $86_S$ come closer to the plate-like workpieces $12_H$, $12_M$ as the diameters of the roller electrodes $20_U$, $20_S$ decrease due to wear, as indicated by broken lines in FIG. 15. Therefore, it may be impossible to prevent the above-indicated convex deformation F of the plate-like workpieces $12_H$, $12_M$, depending upon the thickness of the workpieces.

FIG. 15 shows an embodiment in which a presser device is provided for preventing the occurrence of the above-indicated convex deformation F. In the apparatus of FIG. 15, auxiliary roller sets $130_{HU}$, $130_{HS}$, $130_{MU}$, $130_{MS}$ are interposed between the roller electrodes $20_U$, $20_S$ and the pair of retainer rollers $16_{HU}$, $16_{HS}$, and between the roller electrodes $20_U$, $20_S$ and the pair of retainer rollers $16_{MU}$, $16_{MS}$, in the direction perpendicular to the feeding direction B, that is, in the axial direction of the roller electrodes. These auxiliary roller sets $130_{HU}$, $130_{HS}$, $130_{MU}$, $130_{MS}$ are located so as to press the portions of the workpieces at which the convex deformation F is expected to take place. Described more specifically, the auxiliary roller sets $130_{HS}$ and $130_{MS}$ located below the plate-like workpieces $12_H$, $12_M$ are rotatably supported by the end portions of brackets $132_{HS}$ and $132_{MS}$ fixed to the base blocks $53_H$, $53_M$, while the auxiliary roller sets $130_{HU}$ and $130_{MU}$ located above the plate-like workpieces $12_H$, $12_M$ are rotatably supported by the end portions of brackets $132_{HU}$ and $132_{MU}$ fixed to the movable plates $60_H$, $60_M$. The above auxiliary roller sets $130_{HU}$, $130_{HS}$, $130_{MU}$, $130_{MS}$ are rotatable about axes C4 which are parallel to the rotation axes C3 of the roller electrodes $20_U$, $20_S$ and the axes C2 of the pair of retainer rollers $16_{HU}$, $16_{HS}$. The plate-like workpieces $12_H$, $12_M$ are pressed with predetermined squeezing forces at their portions laterally adjacent to the roller electrodes $20_U$, $20_M$, by the upper and lower auxiliary roller sets $130_{HU}$, $130_{HS}$ and the upper and lower auxiliary roller sets $130_{MU}$, $130_{MS}$.

Figure 16:
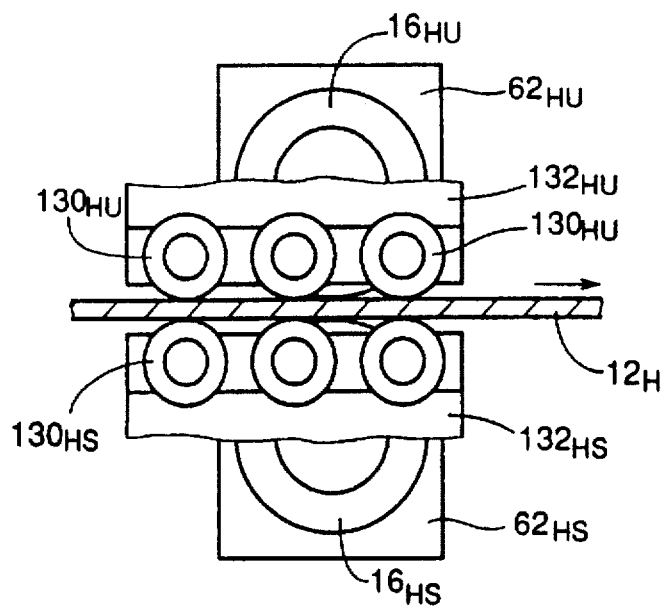
FIG. 16 is a view explaining the arrangement of auxiliary rollers in the embodiment of FIG. 15.

As also shown in FIG. 16, each of the above auxiliary roller sets $130_{HU}$, $130_{HS}$, $130_{MU}$, $130_{MS}$ consists of three rollers which are arranged in the feeding direction B on the end portion of the appropriate bracket $132_{HU}$, $132_{MU}$ $132_{HS}$, $132_{MS}$, so as to apply sufficient pressing forces to prevent the convex deformation F which would otherwise take place on the plate-like workpieces $12_H$, $12_M$ in the feeding direction B. To permit the above auxiliary rollers $130_{HU}$, $30_{HS}$, $130_{MU}$, $130_{MS}$ to be located sufficiently close to the roller electrodes $20_U$, $20_S$, the diameter of the auxiliary rollers is made smaller than the distance between the plate-like workpiece $12_H$, $12_M$ and the end of the appropriate support block $86_U$, $86_S$ as positioned (the position being indicated by broken lines in FIG. 15) when the roller electrode $20_U$, $20_S$ has the largest amount of wear, so that the auxiliary rollers may be located between the ends of the support blocks $86_U$, $86_S$ and the plate-like workpieces $12_H$, $12_M$. FIG. 16 is a view showing the brackets $132_{HU}$, $132_{HS}$ on the left side of the feeding direction B, and the auxiliary rollers $130_{HU}$, $130_{HS}$ rotatably supported by these brackets $132_{HU}$, $132_{HS}$, which view is taken from the roller electrodes $20_U$, $20_S$ toward the auxiliary rollers. In the present embodiment, the above-indicated auxiliary rollers $130_{HU}$, $130_{HS}$, $130_{MU}$, $130_{MS}$ and the brackets $132_{HU}$, $132_{HS}$, $132_{MU}$, $132_{MS}$ supporting these auxiliary rollers function as the presser device for preventing the convex deformation F.

Figure 17:
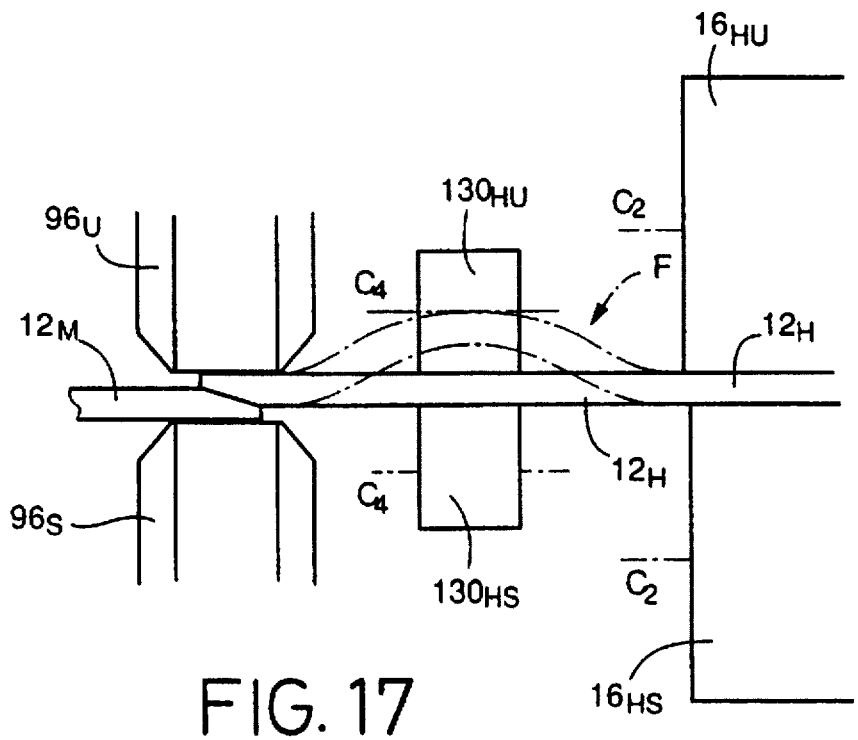
FIG. 17 is a view explaining an operation of the auxiliary rollers to prevent convex deformation F in the embodiment of FIG. 15.

In the present embodiment, the auxiliary rollers $130_{HU}$, $130_{HS}$, $130_{MU}$, $130_{MS}$ and the brackets $132_{HU}$, $132_{HS}$, $132_{MU}$, $132_{MS}$ supporting these auxiliary rollers are provided to function as the presser device for preventing the convex deformation F of the plate-like workpieces $12_H$, $12_M$ between the roller electrodes $20_U$, $20_S$ and the retainer rollers $16_{HU}$, $16_{HS}$ and between the roller electrodes $20_U$, $20_S$ and the retainer rollers $16_{MU}$, $16_{MS}$. The presser device is adapted to press (perform a pressing step on) the portions of the plate-like workpieces $12_H$, $12_M$ at which the convex deformation F is expected to take place, whereby the convex deformation F indicated by one-dot chain lines in FIG. 17 is prevented, even if the plate-like workpieces $12_H$, $12_M$ have small thickness values. Accordingly, the presser device can suitably prevent the displacement of the edge portions of the plate-like workpieces $12_H$, $12_M$ away from each other due to the convex deformation F, and the resulting failure of formation of the weld nugget N within the thickness of the plate-like workpieces $12_H$, $12_M$ due to the above displacement.

Figure 18:
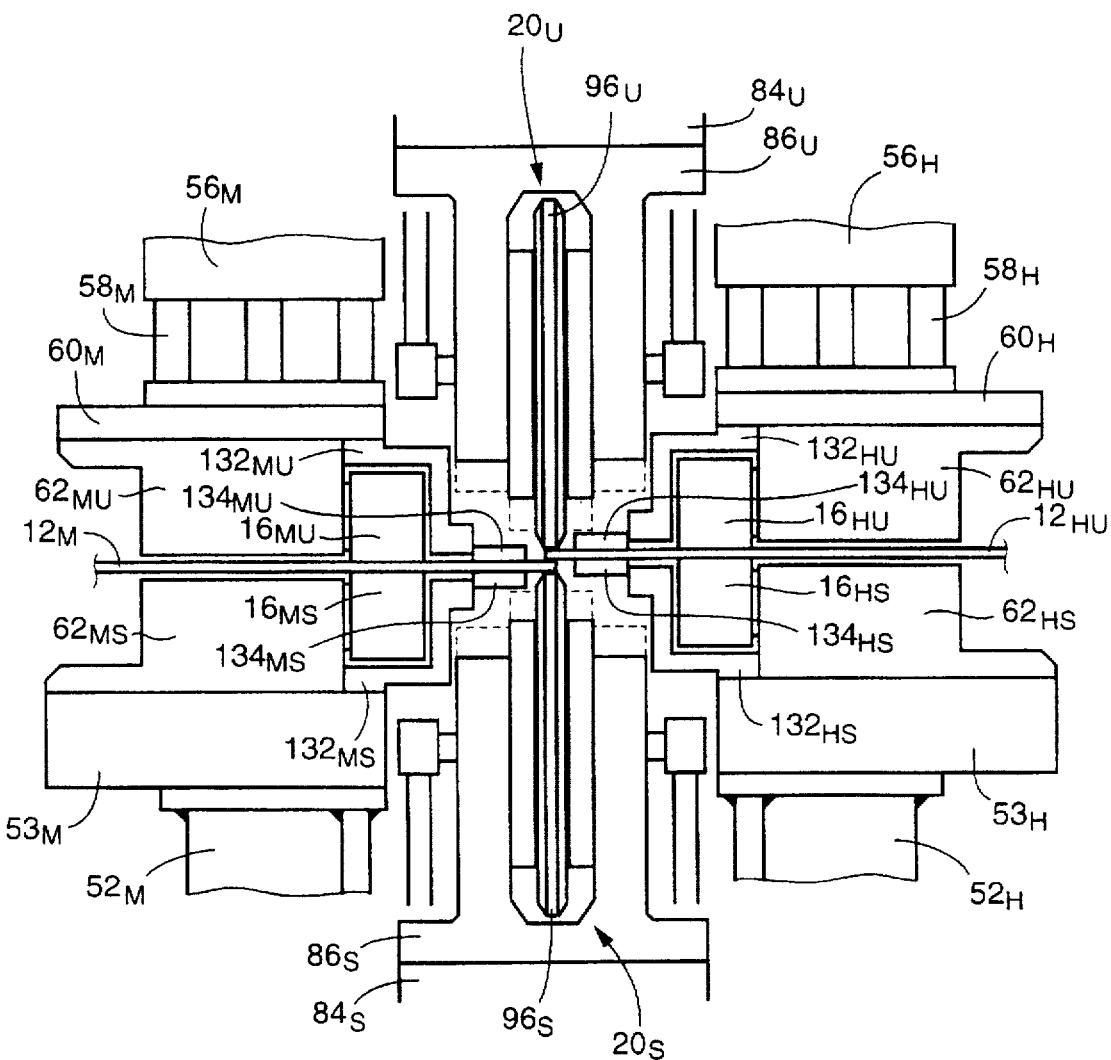
FIG. 18 is a view corresponding to that of FIG. 15, explaining the roller electrodes and retainer rollers and their vicinity in another embodiment of this invention.
Figure 19:
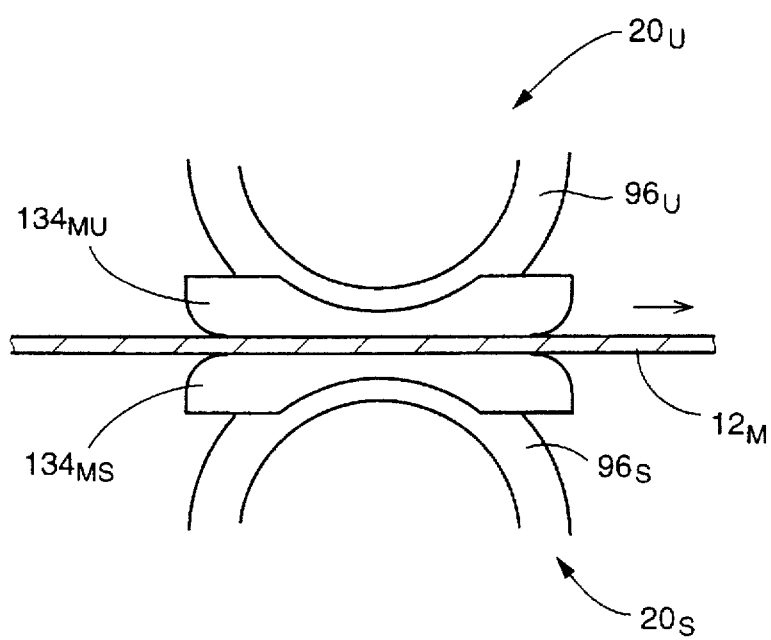
FIG. 19 is a side view showing auxiliary skids in the embodiment of FIG. 18.

In an embodiment shown in FIG. 18, auxiliary skids $134_{HU}$, $134_{HS}$, $134_{MU}$, $134_{MS}$ for sliding contact with the plate-like workpieces $12_H$, $12_M$ are provided on the end portions of the brackets $132_{HU}$, $132_{HS}$, $132_{MU}$, $132_{MS}$, in place of the auxiliary rollers $130_{HU}$, $130_{HS}$, $130_{MU}$, $130_{MS}$ provided in the above embodiment of FIG. 15. These auxiliary skids $134_{HU}$, $134_{HS}$, $134_{MU}$, $134_{MS}$ have a height dimension which is smaller than the distance between the plate-like workpiece $12_H$, $12_M$ and the end of the support block $86_U$, $86_S$ as positioned (the position being indicated by broken lines) when the roller electrode $20_U$, $20_S$ has the largest amount of wear, so that the auxiliary skids may be located between the ends of the support blocks $86_U$, $86_S$ and the plate-like workpieces $12_H$, $12_M$. As also shown in FIG. 19, the auxiliary skids $134_{HU}$, $134_{HS}$, $134_{MU}$, $134_{MS}$ are adapted to press the plate-like workpieces $12_H$, $12_M$ on their upper and lower surfaces, at the same positions as the above auxiliary rollers $130_{HU}$, $130_{HS}$, $130_{MU}$, $130_{MS}$. Preferably, the auxiliary skids $134_{HU}$, $134_{HS}$, $134_{MU}$, $134_{MS}$ are formed of a material such as sintered metal impregnated with molybdenum disulfide or carbon, which has a high wear resistance and a low friction coefficient. The present embodiment has the same advantage as the embodiment of FIG. 15. It is noted that FIG. 19 is a view showing the right auxiliary skids $134_{MU}$, $134_{MS}$ and the roller electrodes $20_U$, $20_S$, which view is taken from the right side of the feeding direction.

Figure 20:
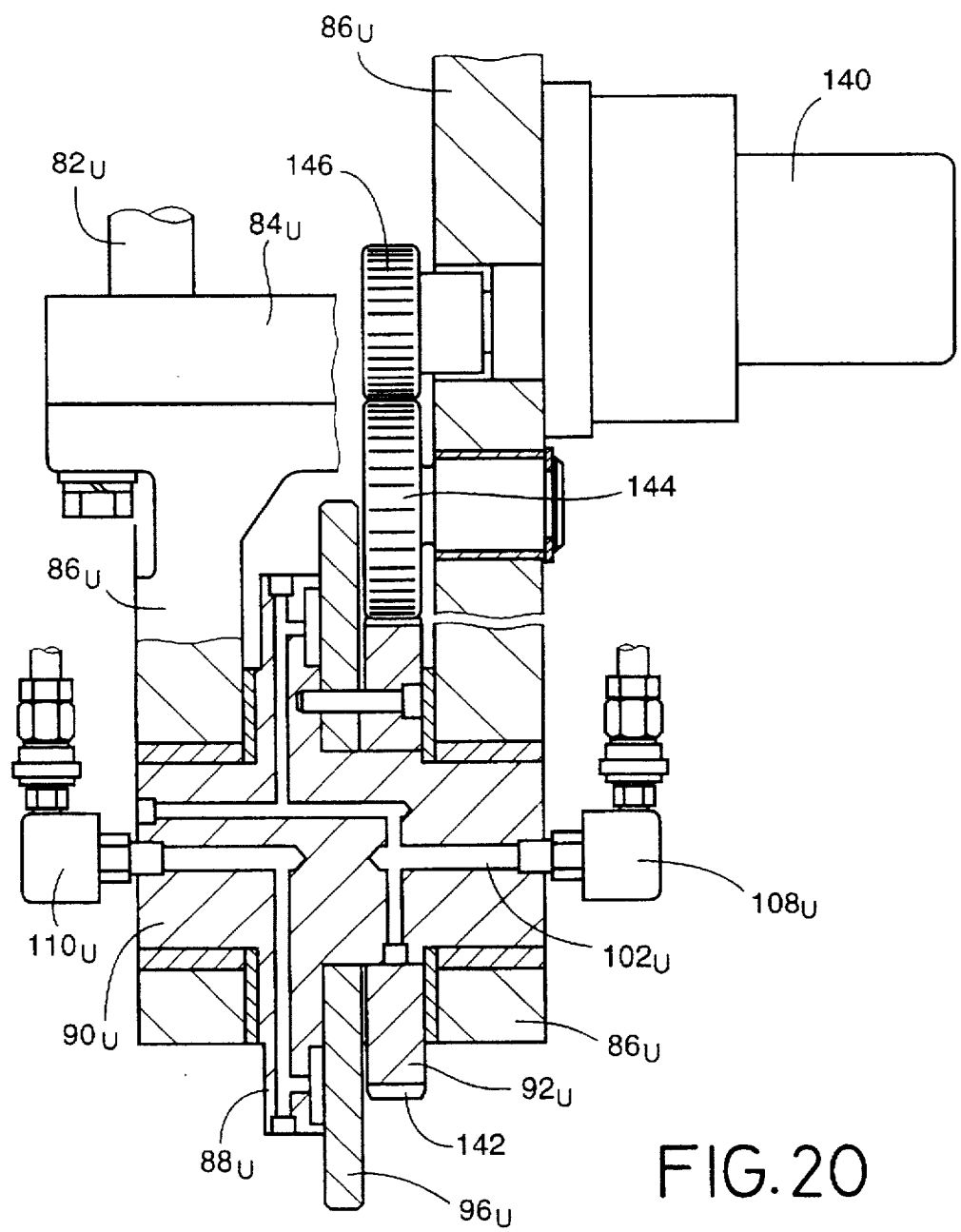
FIG. 20 is a view explaining a roller electrode in another embodiment of this invention.

FIG. 20, which illustrates another embodiment of this invention, shows the roller electrode 20U rotated by an electric motor 140. In the embodiment of FIG. 20, the pressure plate $92_U$ for holding the circular electrode disk $96_U$ under pressure onto the flange portion $88_U$ of the rotary shaft $90_U$ is formed with outer circumferential teeth 142 which meshes with an intermediate gear 144 rotatably supported by the support block $86_U$. The electric motor 140 is provided with an output gear 146 which engages the pressure plate $92_U$ through the intermediate gear 144, and is fixed to the support block $86_U$. The electric motor 140 is adapted to rotate the roller electrode $20_U$ so that the peripheral speed of the roller electrode $20_U$ when the roller electrode $20_U$ is not in contact with the plate-like workpiece $12_H$ is higher than the feeding speed of the workpiece $12_H$, whereby the roller electrode $20_U$ transfers a driving force to the plate-like workpiece $12_H$ to feed it in the feeding direction after the workpiece $12_H$ is brought into contact with the roller electrode $20_U$. It is noted that FIG. 20 is a view developed about the axis of the intermediate gear 144, regarding the positional relationship between the electric motor 140, intermediate gear 144 and their vicinity.

Figure 21:
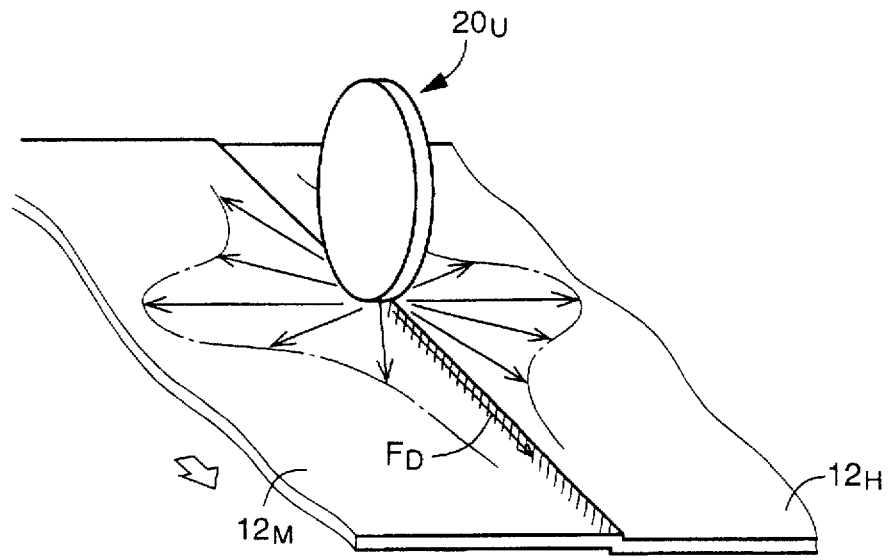
FIG. 21 is view explaining an operation of the roller electrode in the embodiment of FIG. 20.
Figure 22:
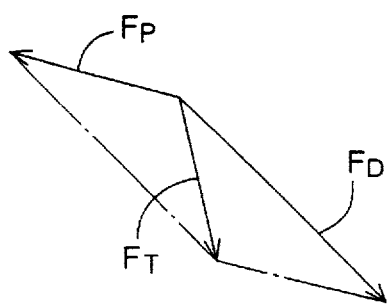
FIG. 22 is a view explaining the operation of the roller electrode in the embodiment of FIG. 20.

When the edge portions of the pair of plate-like workpieces $12_H$, $12_M$ are squeezed by the roller electrodes $20_U$, $20_S$ in the seam welding operation, the expanding force acts on the plate-like workpieces $12_H$, $12_M$ in a radial direction from the point of squeezing by the roller electrodes $20_U$, $20_S$, as indicated by arrows in FIG. 21. The radial components of the squeezing force which act in the rear (upstream) direction toward the unwelded portions (in the welding direction from the welded portion toward the weld end) are considered to have the largest influence on the welding process. In the present embodiment, the roller electrode $20_U$ is rotated by the electric motor 140 to transfer the driving force to the plate-like workpiece $12_H$ in the feeding direction during the seam welding (Roller Electrode Driving Step). Thus, the roller electrode $20_U$ produces a drive force $F_D$ in the feeding direction, as indicted in FIGS. 21 and 22. This drive force $F_D$ cooperates with a radial component of the squeezing force acting in the direction toward the unwelded portion, for example, a component $F_p$, to constitute a resultant force $F_T$ as indicated in FIG. 22, which resultant force $F_T$ includes a component acting in the direction toward the welded portion. However, the welded portion of the plate-like workpieces $12_H$, $12_M$ is not significantly influenced by the above resultant force $F_T$. Accordingly, the radial components of the squeezing force which act in the welding direction from the welded portion toward the weld end are restricted, whereby the generation of buckling or convex deformation F of the plate-like workpieces $12_H$, $12_M$ is suitably eliminated. Thus, the present embodiment is adapted to restrict the expanding force of the plate-like workpieces $12_H$, $12_M$, and is advantageously effective to suitably prevent the formation of the weld nugget at a position apart from the interface the edge portions of the plate-like workpieces $12_H$, $12_M$ due to the displacement of the edge portions away from each other while being squeezed between the roller electrodes $20_U$, $20_S$.

Figure 23:
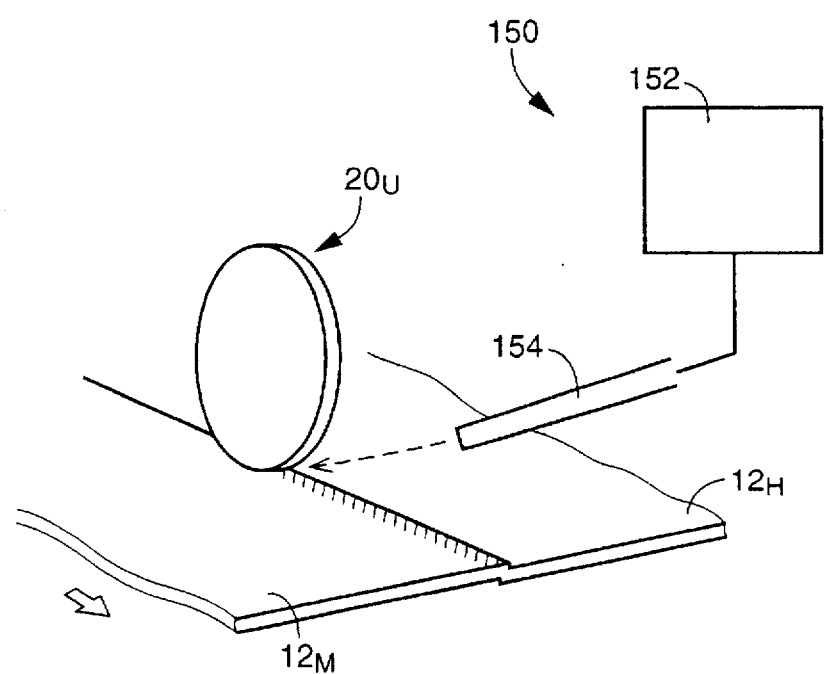
FIG. 23 is a view explaining an arrangement of a roller electrode and its vicinity in another embodiment of this invention.

FIG. 23 schematically shows a portion of a sea welding apparatus of another embodiment of this invention. In the apparatus of FIG. 23, there is provided a coolant supply device 150 comprised of a coolant supply source 152 and an injection nozzle 154. The coolant supply source 152 is provided with a pump or accumulator for delivering a coolant fluid such as air, gas, water or oil under pressure, and a cooling device as needed to cool the coolant fluid. The coolant fluid under pressure is delivered to the injection nozzle 154. During the welding operation, the coolant fluid delivered from the above coolant supply source 152 is injected from the injection nozzle 154 to the point of squeezing of the workpieces by the roller electrodes $20_U$, $20_S$ and its vicinity, that is, to the portion of the workpieces which is heated by application of the electric current by the roller electrodes $20_U$, $20_S$, whereby the plate-like workpieces $12_H$, $12_M$ are cooled (Coolant Supply Step). In this embodiment, the portion of the plate-like workpieces $12_H$, $12_M$ which is heated by the application of the electric current by the roller electrodes $20_U$, $20_S$ in the seam welding operation is cooled by the coolant supply device 150, so as to restrict the expanding force of the plate-like workpieces $12_H$, $12_M$ due to heat of the weld nugget N formed within the workpieces $12_H$, $12_M$ between the roller electrodes $20_U$, $20_S$, whereby the difficulty in forming the weld nugget N within the workpieces $12_H$, $12_M$ is suitably prevented.

Figure 24:
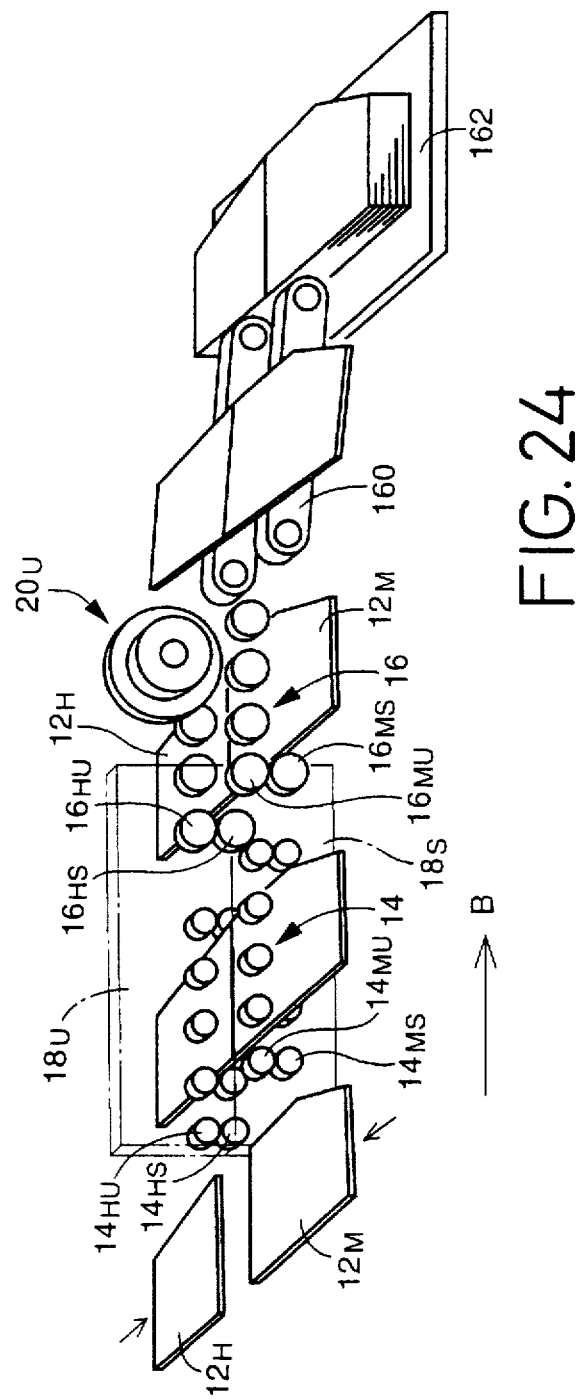
FIG. 24 is a perspective view showing a schematic arrangement of a seam welding apparatus in another embodiment of this invention.

FIG. 24 schematically shows a portion of a seam welding apparatus of another embodiment of this invention. This embodiment is different from the embodiment of FIG. 1 mainly in that four sets of retainer rollers 16 are provided in the present embodiment while only one set of retainer roller 16 is provided in the embodiment of FIG. 1. IN the apparatus of FIG. 14, the pair of plate-like workpieces $12_H$, $12_M$ introduced at a predetermined position by a work loading device (not shown) such as a pusher device are fed in the feeding direction B (Feeding Step), while the workpieces are guided in sliding contact with the guide surfaces $24_U$, $24_S$ of the pair of upper and lower guide members $18_U$, $18_S$ (Guiding Step), such that the overlapping edge portions of the workpieces are positioned relative to each other so as to establish the predetermined lap amount (lap width) S. Then, the pair of plate-like workpieces $12_H$, $12_M$ are seam-welded together (Welding Step) with a welding current applied between the pair of roller electrodes $20_U$, $20_S$ while the workpieces are squeezed by the pair of upper and lower roller electrodes $20_U$, $20_S$ at their overlapping edge portions positioned relative to each other. The seam welding of the pair of plate-like workpieces $12_H$, $12_M$ is effected along the welding centerline A which is parallel to the feeding direction B and which passes the center of the lap width S of the overlapping edge portions of the workpieces. In the welding step, the pair of plate-like workpieces $12_H$, $12_M$ are squeezed in the direction of thickness with a predetermined squeezing force by the four sets of retainer rollers 16 disposed on the opposite sides of the roller electrodes $20_U$, $20_S$, whereby the plate-like workpieces $12_H$, $12_M$ are prevented from being moved away from each other (Holding Step). The pairs of plate-like workpieces $12_H$, $12_M$ which have been welded together are unloaded by a conveyor 160 and placed in stack on a pallet 162.

While the embodiments of this invention have been explained referring to the drawings, the invention may be otherwise embodied.

For example, the illustrated embodiments adapted to seam-weld the plate-like workpieces $12_H$, $12_M$ at their edge portions may be modified to seam-weld the workpieces at their portions located inwardly from the edge portions.

Further, although the illustrated embodiments are adapted to effect a so-called mash seam welding operation in which the edge portions of the plate-like workpieces $12_H$, $12_M$ are squeezed and mashed by the pair of roller electrodes $20_U$, $20_S$, the invention is applicable to a seam welding operation in which the workpieces are merely squeezed by the roller electrodes $20_U$, $20_S$. In this case, the edge portions of the plate-like workpieces $12_H$, $12_M$ which are to contact each other may be subjected to a preliminary treatment such as a chambering operation to remove parts of the edge portions or a mashing operation to mash and shape the edge portions.

In the illustrated embodiments, the guide rollers 14 and the retainer rollers 16 include the lower guide rollers $14_{HS}$, $14_{MS}$ and the lower retainer rollers $16_{HS}$, $16_{MS}$ which are located below the plate-like workpieces $12_H$, $12_M$ and which are driven by the drive motors 76. However, the upper guide rollers $14_{HU}$, $14_{MU}$ and the upper retainer rollers $16_{HU}$, $16_{MU}$ are driven by the drive motors 76, or the upper and lower guide and retainer rollers are both driven by the drive motors 76.

While all of the guide rollers $14_{HS}$, $14_{MS}$ are driven by the drive motors 76 in the illustrated embodiments, only the selected ones of these guide rollers may be driven. In the case where the pair of plate-like workpieces $12_H$, $12_M$ can be sufficiently fed by a plurality of sets of guide rollers 14, the set of retainer rollers 16 in the embodiments of FIGS. 1–9 need not be driven.

Further, at least one of the pair of roller electrodes $20_U$, $20_S$ in the embodiment of FIGS. 1–9 may be driven by the electric motor 140 shown in FIG. 20, for example, at a peripheral speed equal to the feeding speed of the pair of plate-like workpieces $12_H$, $12_M$.

In the embodiment of FIGS. 1–9, the guide rollers 14 are inclined by a predetermined angle θ for pressing the pair of plate-like workpieces $12_H$, $12_M$ toward the guide members $18_U$, $18_S$ while the workpieces are fed. However, slant guiding plates may be provided for contact with the outer edges of the pair of plate-like workpieces $12_H$, $12_M$, such that the slant guiding plates approach the guide members $18_U$, $18_S$ as it extends in the feeding direction.

It is to be understood that the foregoing embodiments are provided for illustrative purpose only, and that various changes may be made in the illustrated embodiments, without departing from the spirit of the invention.

We claim:

1. A seam welding process of continuously welding two plate-like workpieces at overlapping edge portions thereof while said overlapping edge portions are squeezed by a pair of roller electrodes disposed rotatably about respective two parallel axes thereof, said seam welding process comprising:

a feeding step of feeding said two plate-like workpieces in a feeding direction toward said roller electrodes by a plurality of sets of guide rollers such that said two plate-like workpieces are pinched by said guide rollers in a direction of thickness thereof while said guide rollers are rotated;

a guiding step of guiding said two plate-like workpieces being fed by said guide rollers, such that said edge portions overlap each other with a predetermined lap amount so that the overlapping edge portions are squeezed by said pair of roller electrodes; and a welding step of continuously welding said edge portions of said two plate-like workpieces squeezed by said pair of roller electrodes, by applying a welding current between said pair of roller electrodes.

2. A seam welding process according to claim 1, wherein said guiding step comprises providing a guide member which is fixedly disposed upstream of said pair of roller electrodes in said feeding direction (B) and which has a pair of guide surfaces extending in a direction perpendicular to said axes of said roller electrodes, and guiding said two plate-like workpieces such that end faces of said overlapping edge portions of said two plate-like workpieces are in sliding contact with said pair of guide surfaces.

3. A seam welding process according to claim 2, wherein said plurality of sets of guide rollers include at least two pairs of guide rollers, and said guiding step comprises locating said at least two pairs of guide rollers on opposite sides of said guide member to pinch said two plate-like workpieces in the direction of thickness, and operating said at least two pairs of guide rollers so as to generate forces including components which acting in directions toward said pair of guide surfaces of said guide member while said two plate-like workpieces are fed, whereby said end faces of said overlapping edge portions of said two plate-like workpieces are brought into sliding contact with said guide surfaces.

4. A seam welding process according to claim 1, wherein said welding process comprises welding said two plate-like workpieces while said overlapping edge portions are squeezed to be mashed by and between said pair of roller electrodes which are biased toward each other.

5. A seam welding process according to claim 1, further comprising a holding step of squeezing, in said welding step, said two plate-like workpieces in the direction of thickness with a predetermined squeezing force by two pairs of retainer rollers disposed on opposite sides of said pair of roller electrodes, respectively, such that said two pairs of retainer rollers generate friction forces enough to resist expanding forces of said two plate-like workpieces in said welding step, to thereby prevent movements of said two plate-like workpieces away from each other.

6. A seam welding process according to claim 5, further comprising a pressing step of pressing said plate-like workpieces at portions thereof which are located between said roller electrodes and said retainer rollers in an axial direction of said roller electrodes and at which convex deformation is expected to take place in said welding step.

7. A seam welding process according to claim 1, further comprising an electrode driving step of rotating said roller electrodes so as to transfer a driving force to said plate-like workpieces in said feeding direction.

8. A seam welding process according to claim 1, further comprising a step of supplying a coolant fluid to portions of said plate-like workpieces (12) which are squeezed by said roller electrodes (20) and heated in said welding step by said roller electrodes.

9. A seam welding apparatus for continuously welding two plate-like workpieces at overlapping edge portions thereof while said overlapping edge portions are squeezed by a pair of roller electrodes disposed rotatably about respective two parallel axes thereof and while a welding current is applied between said pair of roller electrodes, said seam welding apparatus comprising:

a pair of roller electrodes disposed rotatably about respective two parallel axes thereof and biased toward each other;

a plurality of sets of guide rollers which are disposed on opposite sides of said two plate-like workpieces in a direction of thickness of said workpieces and which are rotatable about axes thereof substantially parallel to said axes of said roller electrodes;

a driving device for rotating at least one set of said plurality of sets of guide rollers in a predetermined rotating direction, to feed said two plate-like workpieces in a feeding direction while said two plate-like workpieces are pinched by said guide rollers; and a guiding device for guiding said two plate-like workpieces being fed in said feeding direction by said driving device, such that said edge portions overlap each other with a predetermined lap amount so that the overlapping edge portions are squeezed by said pair of roller electrodes.

10. A seam welding apparatus according to claim 9, wherein said guide device includes a guide member which is fixedly disposed upstream of said pair of roller electrodes and which has a pair of guide surfaces extending in a direction perpendicular to said axes of said roller electrodes, said guide device positioning said two plate-like workpieces relative to each other during feeding of said plate-like workpieces such that end faces of said overlapping edge portions of said two plate-like workpieces are in sliding contact with said pair of guide surfaces.

11. A seam welding apparatus according to claim 10, wherein said guide device further includes at least two pairs of guide rollers located on opposite sides of said guide member to pinch said two plate-like workpieces in the direction of thickness, said at least two pairs of guide rollers guiding said two plate-like workpieces such that said two plate-like workpieces approach said pair of guiding surfaces of said guide member as said two plate-like workpieces approach said roller electrodes, whereby said end faces of said overlapping edge portions of said two plate-like workpieces are brought into sliding contact with said guide surfaces.

12. A seam welding apparatus according to claim 9, wherein said pair of roller electrodes weld said edge portions of said two plate-like workpieces while said edge portions of the plate-like workpieces are squeezed to be mashed by said pair of roller electrodes.

13. A seam welding apparatus according to claim 9, further comprising:

two pairs of retainer rollers which are disposed on opposite sides of said pair of roller electrodes and which are rotatable about respective axes parallel to said axes of said pair of roller electrodes, said two pairs of retainer rollers squeezing said two plate-like workpieces in the direction of thickness while said two plate-like workpieces are squeezed by said pair of roller electrodes; and a squeezing force applying device for applying to said two pairs of retainer rollers squeezing forces which permit said retainer rollers to generate friction forces enough to resist expanding forces of said two plate-like workpieces which are generated during welding thereof by said pair of roller electrodes.

14. A seam welding apparatus according to claim 13, further comprising a presser device (130, 134) for pressing portions of said plate-like workpieces (12) which are located between said roller electrodes (20) and said retainer rollers (16) in an axial direction of said roller electrodes and at which convex deformation is expected to take place.

15. A seam welding apparatus according to claim 14, wherein said presser device includes auxiliary rollers which are interposed between said pair of roller electrodes and said retainer rollers in said axial direction of said roller electrodes and which are rotatable about respective axes parallel to said axes of said roller electrodes, said auxiliary rollers pressing said two plate-like workpieces while permitting said plate-like workpieces to be fed in said feeding direction.

16. A seam welding apparatus according to claim 14, wherein said presser device includes auxiliary skids which are interposed between said roller electrodes and said retainer rollers in said axial direction of said roller electrodes, for sliding contact with said plate-like workpieces.

17. A seam welding apparatus according to claim 9, further comprising an electrode driving device for rotating said roller electrodes so as to transfer a driving force to said plate-like workpieces in the feeding direction.

18. A seam welding apparatus according to claim 9, further comprising a coolant supply device for supplying a coolant fluid to portions of said plate-like workpieces which are squeezed and heated for seam welding by said roller electrodes.

* * * * *